United States Patent
Ryu et al.

(10) Patent No.: US 11,632,797 B2
(45) Date of Patent: Apr. 18, 2023

(54) METHOD AND APPARATUS FOR RECEIVING UL DATA IN WIRELESS LAN SYSTEM

(71) Applicant: LG ELECTRONICS INC., Seoul (KR)

(72) Inventors: Kiseon Ryu, Seoul (KR); Jeongki Kim, Seoul (KR); Sanggook Kim, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 144 days.

(21) Appl. No.: 17/263,051

(22) PCT Filed: Jul. 25, 2019

(86) PCT No.: PCT/KR2019/009273
§ 371 (c)(1),
(2) Date: Jan. 25, 2021

(87) PCT Pub. No.: WO2020/022814
PCT Pub. Date: Jan. 30, 2020

(65) Prior Publication Data
US 2021/0307064 A1    Sep. 30, 2021

(30) Foreign Application Priority Data
Jul. 26, 2018 (KR) .................. KR10-2018-0086990

(51) Int. Cl.
*H04W 74/08* (2009.01)
*H04W 84/12* (2009.01)
(52) U.S. Cl.
CPC ........ *H04W 74/0808* (2013.01); *H04W 84/12* (2013.01)

(58) Field of Classification Search
CPC . H04W 74/0808; H04W 84/12; H04W 24/10; H04W 74/08
(Continued)

(56) References Cited

U.S. PATENT DOCUMENTS 10,492,223 B2 * 11/2019 Lee .................. H04W 74/0816
2016/0113034 A1    4/2016 Seok
(Continued)

FOREIGN PATENT DOCUMENTS

| WO | 2017209501 | 12/2017 |
| WO | 2018016313 | 1/2018 |

OTHER PUBLICATIONS

PCT International Application No. PCT/KR2019/009273, International Search Report dated Oct. 29, 2019, 4 pages.

*Primary Examiner* — Kwang B Yao
*Assistant Examiner* — Syed M Bokhari
(74) *Attorney, Agent, or Firm* — Lee Hong Degerman Kang Waimey

(57) ABSTRACT

Proposed is a method and apparatus for receiving UL data in a wireless LAN system. Particularly, a transmission apparatus transmits an NSRP trigger frame to a reception apparatus. The transmission apparatus receives an NSR control frame from the reception apparatus in response to the NSRP trigger frame. The NSR control frame includes an NAV value. When the NAV value is 0, the transmission apparatus transmits a trigger frame to the reception apparatus. The transmission apparatus receives UL data from the reception apparatus on the basis of the trigger frame.

14 Claims, 19 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2016/0128057 A1 | 5/2016 | Seok | |
| 2017/0041953 A1* | 2/2017 | Zhou | H04W 74/0816 |
| 2017/0257888 A1* | 9/2017 | Kneckt | H04W 74/0816 |
| 2017/0367118 A1* | 12/2017 | Choi | H04W 84/12 |
| 2018/0063836 A1* | 3/2018 | Huang | H04W 72/0446 |
| 2018/0205441 A1* | 7/2018 | Asterjadhi | H04W 74/06 |

* cited by examiner

FIG. 1
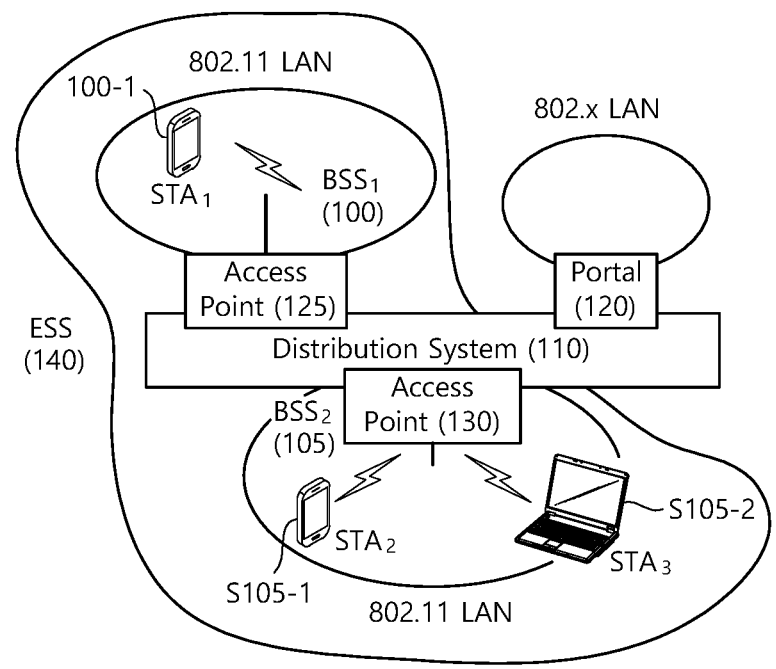
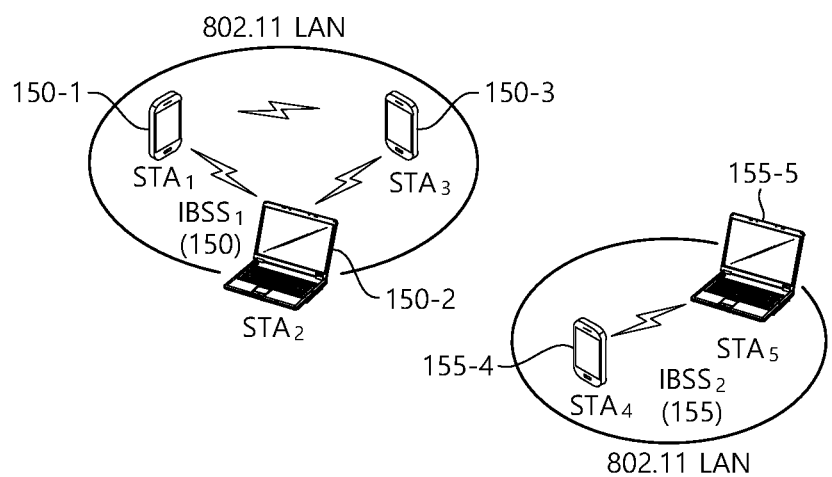

METHOD AND APPARATUS FOR RECEIVING UL DATA IN WIRELESS LAN SYSTEM

CROSS-REFERENCE TO RELATED APPLICATIONS

This application is the National Stage filing under 35 U.S.C. 371 of International Application No. PCT/KR2019/009273, filed on Jul. 25, 2019, which claims the benefit of earlier filing date and right of priority to KR Application No. 10-2018-0086990, filed on Jul. 26, 2018, the contents of which is incorporated by reference herein in its entirety.

BACKGROUND OF THE DISCLOSURE

Field of the Disclosure

This specification relates to a scheme (or method) for receiving UL data in a wireless LAN system and, most particularly, to a method and device for performing UL scheduling by transmitting a trigger frame based on information on a NAV status reported by a wireless LAN system.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments, such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY OF THE DISCLOSURE

Technical Objects

This specification proposes a method and device for receiving UL data in a wireless LAN system.

Technical Solutions

An example of this specification proposes a method for receiving UL data.

This embodiment may be performed in a network environment in which a next generation wireless LAN system is being supported. The next generation wireless LAN system is a wireless LAN system that is enhanced from an 802.11ax system and may, therefore, satisfy backward compatibility with the 802.11ax system. The next generation wireless LAN system may correspond to an Extreme High Throughput (EHT) wireless LAN system or an 802.11be wireless LAN system.

In order to allow an AP to perform UL scheduling more efficiently in a next generation wireless LAN system, such as EHT, this embodiment proposes a method for reporting a NAV status, which is a result of virtual carrier sensing of an STA. By receiving the NAV status report from the STA, the AP may verify until when a BUSY state of a specific channel will be maintained for the corresponding STA. Thus, since the AP does not transmit a trigger frame that allocates resource to an STA being in a BUSY state for the specific channel, unnecessary waste of resources may be prevented.

This embodiment may be performed by a transmitting device, and the transmitting device may correspond to an AP. A receiving device may correspond to an STA supporting an Extreme High Throughput (EHT) wireless LAN system.

The transmitting device transmits a Network Allocation Vector (NAV) Status Report Poll (NSRP) trigger frame to the receiving device.

The transmitting device receives a NAV Status Report (NSR) control frame from the receiving device as a response to the NSRP trigger frame. The NSR control frame includes a NAV value. The NSR control frame represents a frame including NAV information and is not limited to a control frame. Herein, it will be apparent that the NAV information may be transmitted in another format (e.g., management frame, action frame, piggybacked frame, and so on). And, for simplicity in the description, in the present disclosure, this frame will be referred to as a NSR control frame.

If the NAV value is equal to 0, the transmitting device transmits a trigger frame to the receiving device.

The transmitting device receives the UL data from the receiving device based on the trigger frame.

The NSRP trigger frame may include a Channel Sensing (CS) Required subfield. The CS Required subfield may perform a same role (or function) as a CS Required subfield of a trigger frame, which is defined in 802.11ax.

The CS Required subfield may be set to 0. Accordingly, even if the channel through which the NSR control frame is being transmitted is BUSY, the NAV value may be reported to the transmitting device. That is, by setting the CS Required subfield to 0, even an STA that is in a BUSY state for the corresponding channel may be capable of reporting the NAV value.

The NSRP trigger frame may further include a time duration value. For example, in case the NAV value is greater than or equal to the time duration value, the channel may be reported as being BUSY. Additionally, in case the NAV value is smaller than the time duration value, the channel may be reported as being IDLE. As another example, the NSRP trigger frame may instruct the channel status after the time duration value to be reported.

The NSRP trigger frame may be generated based on a Buffer Status Report Poll (BSRP) trigger frame, which is defined in the 802.11ax wireless LAN system.

The BSRP trigger frame may include indicator information. The indicator information may include information on whether or not buffer status information and the NAV value are included in the NSR control frame. That is, by defining a specific trigger frame type, a trigger frame may be configured so as to report both the buffer status information and the NAV status information through the NSR control frame.

The NAV value may be a basic NAV value that is configured based on an Inter-Basic Service Set (BSS) frame. The NAV value may not include a NAV value that is configured based on an Intra-BSS frame.

The NSR control frame may further include a BSSID or BSS Color as an identifier for identifying a BSS. In the present disclosure, for simplicity in the description, only the BSSID will be mentioned as the identifier for identifying a BSS. In case the NAV value is not equal to 0, the BSSID may be configured as an identifier of a BSS in which the Inter-BSS frame is received (or a BSS identifier that is used for configuring the NAV). In case the NAV value is equal to 0, the BSSID may not be reported or may be set to a preconfigured value. That is, the BSSID may be omitted, and the preconfigured value may be set as an associated BSSID value.

The NSR control frame may further include a BSS color ID as an identifier for identifying a BSS.

The BSSID may be included in an address field within a MAC header, and the BSS color ID may be included in a High Efficiency (HE)-signal (SIG)-A, which is defined in the 802.11ax wireless LAN system.

The receiving device may include the NAV value, the BSSID, or the BSS color ID as information on the NAV status, and may report the information on the NAV status to the transmitting device.

The NSR control frame may further include band information for multi-band operation or multi-link operation, identification information for identifying a BSS, and channel information.

The band information may include information on a NAV value, which is defined per band performing the multi-band operation (or per link performing the multi-link operation). The channel information may include information on a NAV value, which is defined per channel performing the multi-band operation. That is, an AP and an STA may separately manage or support a NAV timer per band (or per channel or per link).

A band performing the multi-band operation may be a 2.4 GHz band, a 5 GHz band, or a 6 GHz band. For example, an AP and an STA may separately manage one NAV timer for a 2.4 GHz/5 GHz band and one NAV timer for a 6 GHz band. As another example, an AP and an STA may separately manage a NAV timer for each of the 2.4 GHz, 5 GHz, and 6 GHz bands (a total of three NAV timers).

If the NAV value is not equal to 0, the trigger frame is not transmitted until a NAV timer of the receiving device is expired. Since a specific channel status for the receiving device is BUSY, this is to prevent unnecessary resource from being wasted by transmitting the trigger frame. After waiting until the NAV timer of the receiving device is expired and the channel status becomes IDLE, the transmitting device allocates resource by transmitting the trigger frame. Thus, efficient UL scheduling may be performed.

The trigger frame may be transmitted during one Transmission Opportunity (TXOP) or predetermined time duration.

During the one TXOP, the NSRP trigger frame, the NSR control frame, and the UL data may be transmitted/received.

Effects of the Disclosure

According to the embodiment proposed in this specification, by transmitting a trigger frame after verifying a channel status of an STA based on reported NAV status information, unnecessary resource allocation may be prevented from being performed. If a channel status of the STA is BUSY, by having an AP allocate resource by transmitting a trigger frame after waiting until a NAV timer of an STA is expired, efficient UL scheduling may be performed.

BRIEF DESCRIPTION OF THE DRAWINGS

FIG. 1 is a conceptual view illustrating the structure of a wireless local area network (WLAN).

DESCRIPTION OF EXEMPLARY EMBODIMENTS

Figure 2:
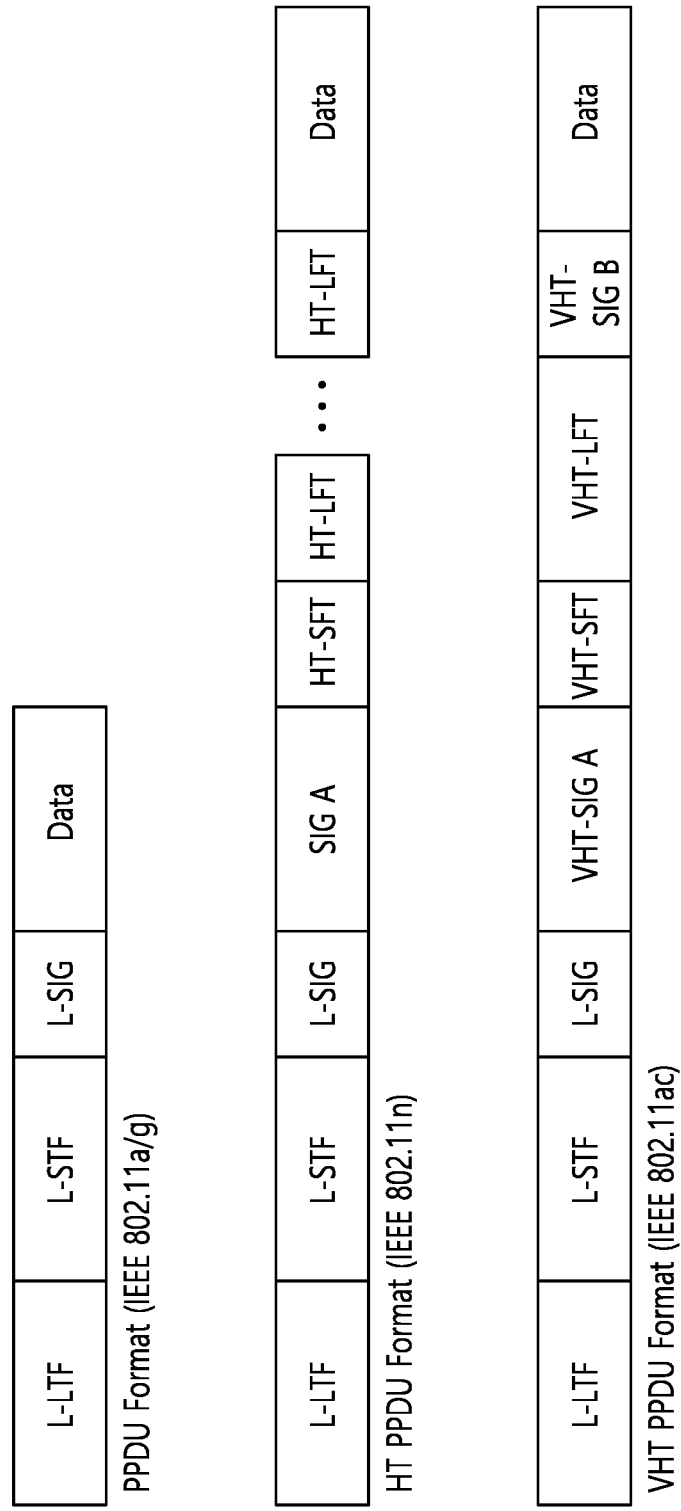
FIG. 2 is a diagram illustrating an example of a PPDU used in an IEEE standard.

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs (100, 105) (hereinafter, referred to as BSS). The BSSs (100, 105), as a set of an AP and an STA such as an access point (AP) (125) and a station (STA1) (100-1) which are successfully synchronized to communicate with each other, are not concepts indicating a specific region. The BSS (105) may include one or more STAs (105-1, 105-2) which may be joined to one AP (130).

The BSS may include at least one STA, APs providing a distribution service, and a distribution system (DS) (110) connecting multiple APs.

The distribution system (110) may implement an extended service set (ESS) (140) extended by connecting the multiple BSSs (100, 105). The ESS (140) may be used as a term indicating one network configured by connecting one or more APs (125, 130) through the distribution system (110). The AP included in one ESS (140) may have the same service set identification (SSID).

A portal (120) may serve as a bridge which connects the wireless LAN network (IEEE 802.11) and another network (e.g., 802.X).

In the BSS illustrated in the upper part of FIG. 1, a network between the APs (125, 130) and a network between the APs (125, 130) and the STAs (100-1, 105-1, 105-2) may be implemented. However, the network is configured even between the STAs without the APs (125, 130) to perform communication. A network in which the communication is performed by configuring the network even between the STAs without the APs (125, 130) is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs (150-1, 150-2, 150-3, 155-4, 155-5) are managed by a distributed manner. In the IBS S, all STAs (150-1, 150-2, 150-3, 155-4, 155-5) may be constituted by movable STAs and are not permitted to access the DS to constitute a self-contained network.

The STA is a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Meanwhile, the term user may be used in various meanings, for example, in wireless LAN communication, this term may be used to signify a STA participating in uplink MU MIMO and/or uplink OFDMA transmission. However, the meaning of this term will not be limited only to this.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, and so on. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
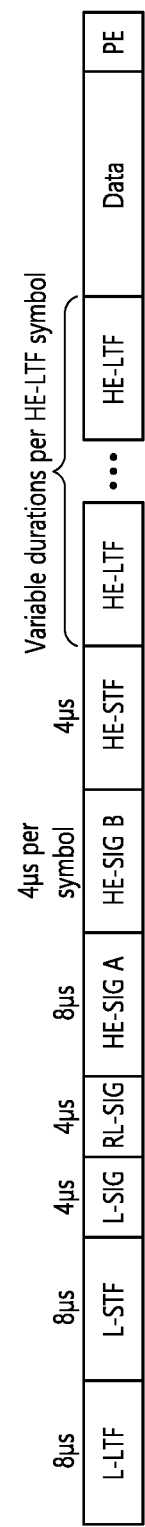
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 µs).

More detailed description of the respective fields of FIG. 3 will be made below.

Figure 4:
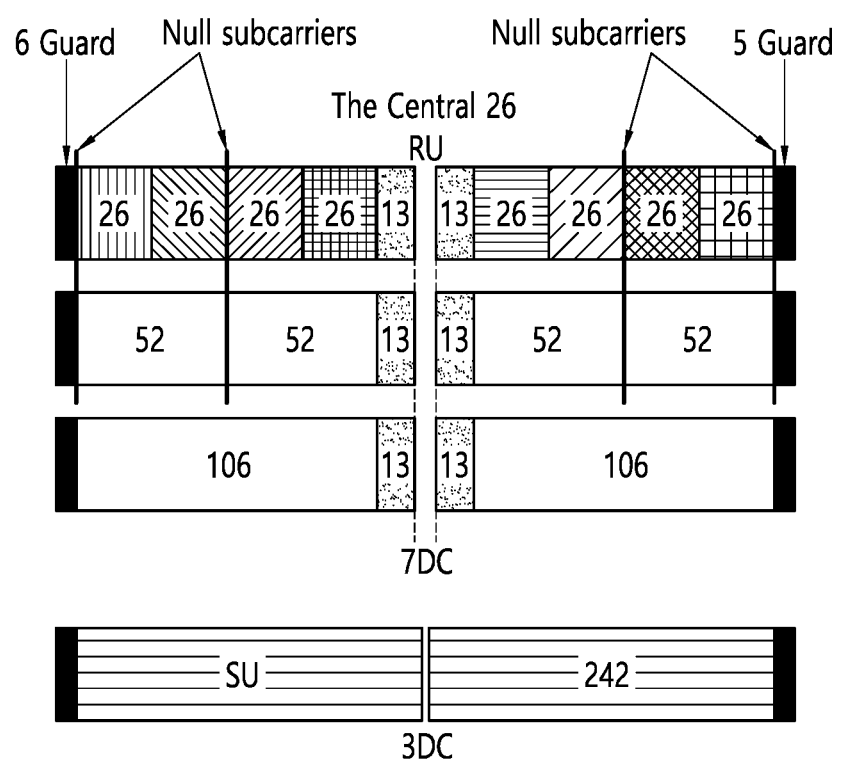
FIG. 4 is a diagram illustrating a layout of resource units (RUs) used in a band of 20 MHz.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated for the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and, in this case, as illustrated in a lowermost part of FIG. 4, one 242-unit may be used and, in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
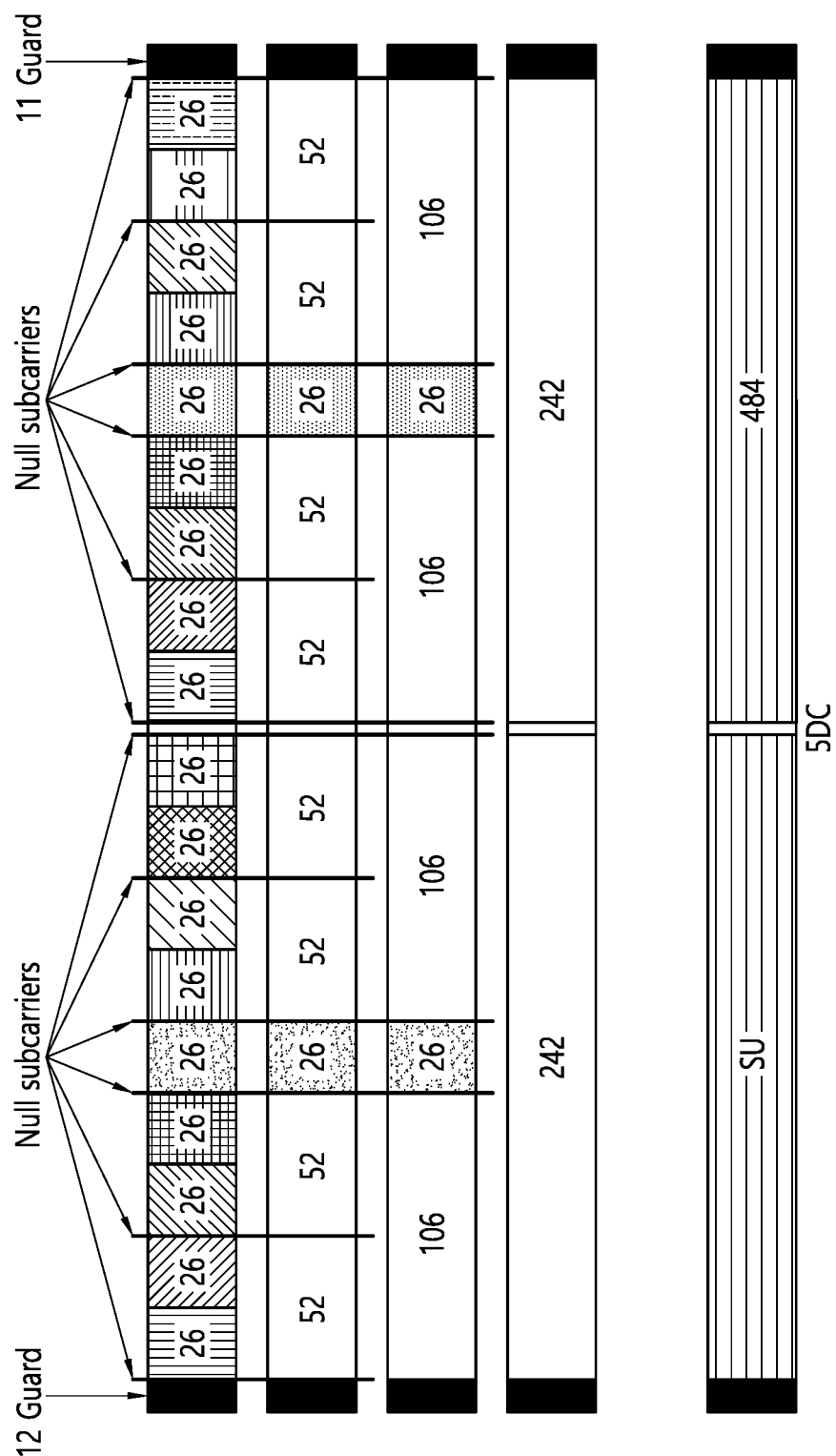
FIG. 5 is a diagram illustrating a layout of resource units (RUs) used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like, may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
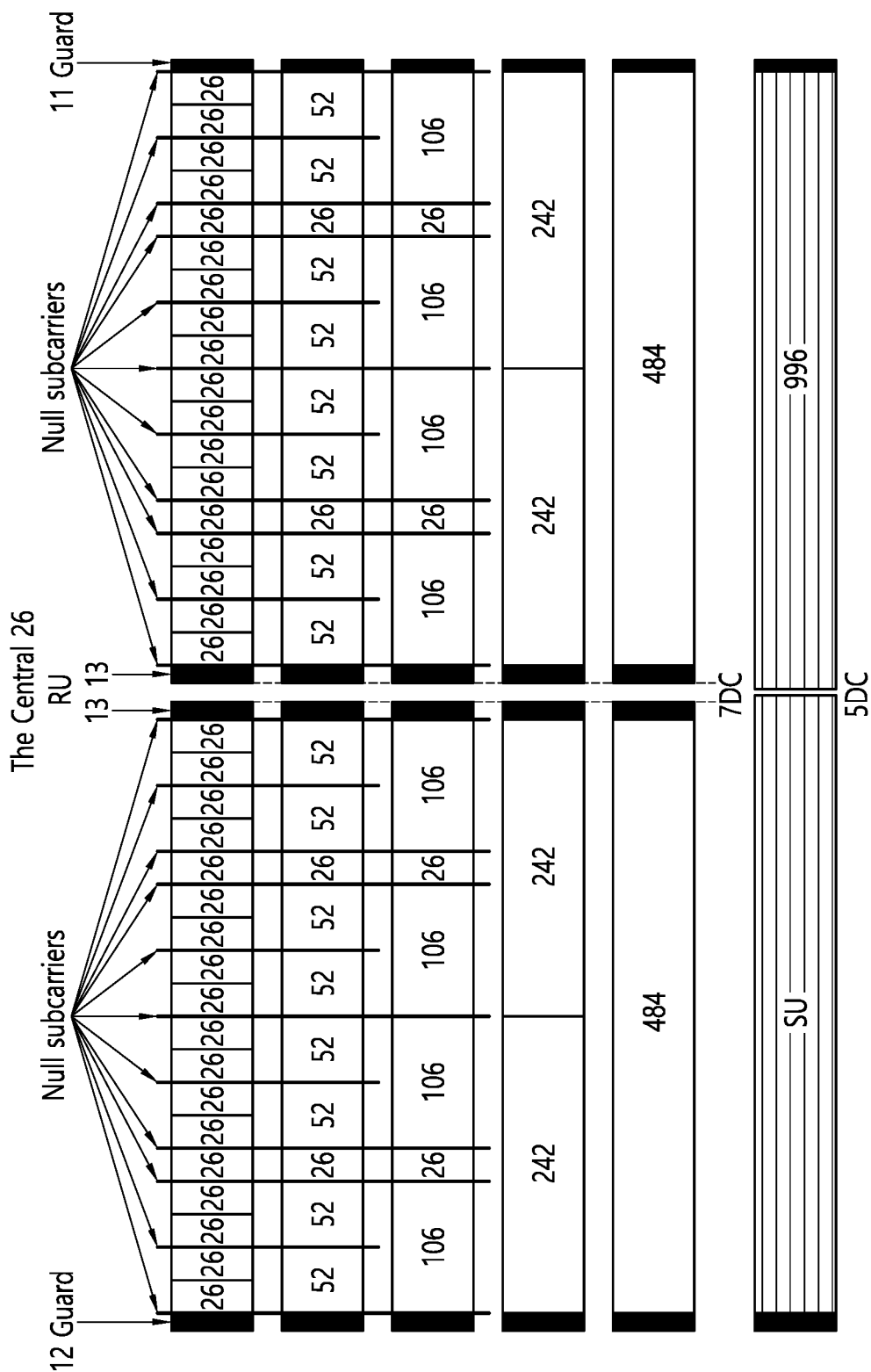
FIG. 6 is a diagram illustrating a layout of resource units (RUs) used in a band of 80 MHz.

FIG. 6 is a diagram illustrating a layout of resource units (RUs) used in a band of 80 MHz.

Similarly to a case in which the RUs having various RUs are used in one example of each of FIG. 4 or 5, 26-RU, 52-RU, 106-RU, 242-RU, 484-RU, and the like, may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and, in this case, 5 DC tones may be inserted.

Meanwhile, the detailed number of RUs may be modified similarly to one example of each of FIG. 4 or FIG. 5.

Figure 7:
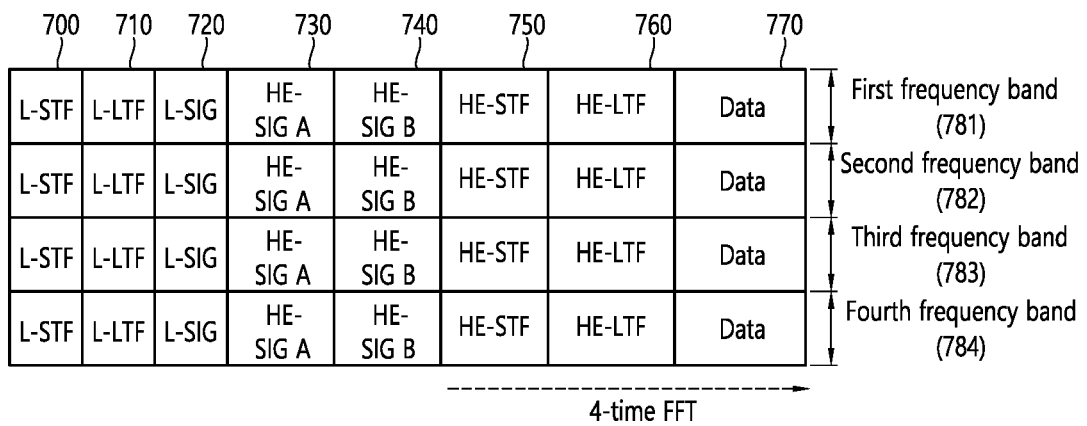
FIG. 7 is a diagram illustrating another example of the HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF (700) may include a short training orthogonal frequency division multiplexing (OFDM) symbol. The L-STF (700) may be used for frame detection, automatic gain control (AGC), diversity detection, and coarse frequency/time synchronization.

An L-LTF (710) may include a long training orthogonal frequency division multiplexing (OFDM) symbol. The L-LTF (710) may be used for fine frequency/time synchronization and channel prediction.

An L-SIG (720) may be used for transmitting control information. The L-SIG (720) may include information regarding a data rate and a data length. Further, the L-SIG (720) may be repeatedly transmitted. That is, a new format, in which the L-SIG (720) is repeated (for example, may be referred to as R-LSIG) may be configured.

A HE-SIG-A (730) may include the control information common to the receiving station.

In detail, the HE-SIG-A (730) may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field on whether the HE-SIG-B is configured for a full bandwidth MIMO transmission, 9) a field indicating the number of symbols of the HE-LTF, 10) a field indicating the length of the HE-LTF and a CP length, 11) a field on whether an OFDM symbol is present for LDPC coding, 12) a field indicating control information regarding packet extension (PE), and 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment.

In addition, the HE-SIG-A (730) may be composed of two parts: HE-SIG-A1 and HE-SIG-A2. HE-SIG-A1 and HE-SIG-A2 included in the HE-SIG-A may be defined by the following format structure (fields) according to the PPDU. First, the HE-SIG-A field of the HE SU PPDU may be defined as follows.

TABLE 1

| Two Parts of HE-SIG-A | Bit | Field | Number of bits | Description |
|---|---|---|---|---|
| HE-SIG-A1 | B0 | Format | 1 | Differentiate an HE SU PPDU and HE ER SU PPDU from an HE TB PPDU: Set to 1 for an HE SU PPDU and HE ER SU PPDU |
| | B1 | Beam Change | 1 | Set to 1 to indicate that the pre-HE modulated fields of the PPDU are spatially mapped differently from the first symbol of the HE-LTF Equation (28-6), Equation (28-9), Equation (28-12), Equation (28-14), Equation (28-16) and Equation (28-18) apply if the Beam Change field is set to 1. Set to 0 to indicate that the pre-HE modulated fields of the PPDU are spatially mapped the same way as the first symbol of the HE-LTF on each tone. Equation (28-8), Equation (28-10), Equation (28-13), Equation (28-15), Equation (28-17) and Equation (28-19) apply if the Beam Change field is set to 0.(#16803) |
| | B2 | UL/DL | 1 | Indicates whether the PPDU is sent UL or DL Set to the value indicated by the TXVECTOR parameter UPLINK_FLAG. |
| | B3-B6 | MCS | 4 | For an HE SU PPDU: Set to n for MCSn, where n = 0, 1, 2, . . . , 11 Values 12-15 are reserved For HE ER SU PPDU with Bandwidth field set to 0 (242-tone RU): Set to n for MCSn, where n = 0, 1, 2 Values 3-15 are reserved For HE ER SU PPDU with Bandwidth field set to 1 (upper frequency 106-tone RU): Set to 0 for MCS 0 Values 1-15 are reserved |

TABLE 1-continued

| Two Parts of HE-SIG-A | Bit | Field | Number of bits | Description |
|---|---|---|---|---|
| | B7 | DCM | 1 | Indicates whether or not DCM is applied to the Data field for the MCS indicated.<br>If the STBC field is 0, then set to 1 to indicate that DCM is applied to the Data field. Neither DCM nor STBC shall be applied if(#15489) both the DCM and STBC are set to 1.<br>Set to 0 to indicate that DCM is not applied to tire Data field.<br>NOTE-DCM is applied only to HE-MCSs 0, 1, 3 and 4. DCM is applied only to 1 and 2 spatial streams. DCM is not applied in combination with STBC(#15490). |
| | B8-B13 | BSS Color | 6 | The BSS Color field is an identifier of the BSS.<br>Set to the value of the TXVECTOR parameter BSS_COLOR. |
| | B14 | Reserved | 1 | Reserved and set to 1 |
| | B15-B18 | Spatial Reuse | 4 | Indicates whether or not spatial reuse is allowed during the transmission of this PPDU(#16804).<br>Set to a value from Table 28-21 (Spatial Reuse field encoding for an HE SU PPDU, HE ER SU PPDU, and HE MU PPDU), see 27.11.6 (SPATIAL_REUSE)<br>Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B19-B20 | Bandwidth | 2 | For an HE SU PPDU:<br>Set to 0 for 20 MHz<br>Set to 1 for 40 MHz<br>Set to 2 for 80 MHz<br>Set to 3 for 160 MHz and 80 + 80 MHz<br>For an HE ER SU PPDU:<br>Set to 0 for 242-tone RU<br>Set to 1 for upper frequency 106-tone RU within the primary 20 MHz<br>Values 2 and 3 are reserved |
| | B21-B22 | GI + LTF Size | 2 | Indicates the GI duration and HE-LTF size.<br>Set to 0 to indicate a 1× HE-LTF and 0.8 µs GI<br>Set to 1 to indicate a 2× HE-LTF and 0.8 µs GI<br>Set to 2 to indicate a 2× HE-LTF and 1.6 µs GI<br>Set to 3 to indicate:<br>a 4× HE-LTF and 0.8 µs GI if both the DCM and STBC fields are 1. Neither DCM nor STBC shall be applied if(#Ed) both the DCM and STBC fields are set to 1.<br>a 4× HE-LTF and 3.2 µs GI, otherwise |
| | B23-B25 | NSTS And Midamble Periodicity | 3 | If the Doppler field is 0, indicates the number of space-time streams.<br>Set to the number of space-time streams minus 1<br>For an HE ER SU PPDU, values 2 to 7 are reserved<br>if the Doppler field is 1, then B23-B24 indicates the number of space time streams, up to 4, and B25 indicates the midamble periodicity.<br>B23-B24 is set to the number of space time streams minus 1.<br>For an HE ER SU PPDU, values 2 and 3 are reserved<br>B25 is set to 0 if TXVECTOR parameter MIDAMBLE_PERIODICITY is 10 and set to 1 if TXVECTOR parameter MIDAMBLE_PERIODICITY is 20. |
| HE-SIG-A2 (HE SU PPDU)or HE-SIG-A3 (HE ER SU PPDU) | B0-B6 | TXOP | 7 | Set to 127 to indicate no duration information if #15491 TXVECTOR parameter TXOP_DURATION is set to UNSPECIFIED.<br>Set to a value less than 127 to indicate duration information for NAV setting and protection of the TXOP as follows:<br>If TXVECTOR parameter TXOP_DURATION is less than 512, then B0 is set to 0 and B1-B6 is set to floor(TXOP_DURATION/8)(#16277).<br>Otherwise, B0 is set to 1 and B1-B6 is set to floor((TXOP_DURATION − 512 )/128)(#16277). where(#16061)<br>B0 indicates the TXOP length granularity. Set to 0 for 8 µs; otherwise set to 1 for 128 µs.<br>B1-B6 indicates the scaled value of the TXOP_DURATION |

TABLE 1-continued

| Two Parts of HE-SIG-A | Bit | Field | Number of bits | Description |
|---|---|---|---|---|
| | B7 | Coding | 1 | Indicates whether BCC or LDPC is used:<br>Set to 0 to indicate BCC<br>Set to 1 to indicate LDPC |
| | B8 | LDPC Extra Symbol Segment | 1 | Indicates the presence of the extra OFDM symbol segment for LDPC:<br>Set to 1 if an extra OFDM symbol segment for LDPC is present<br>Set to 0 if an extra OFDM symbol segment for LDPC is not present<br>Reserved and set to 1 if the Coding field is set to 0(#15492). |
| | B9 | STBC | 1 | If the DCM field is set to 0, then set to 1 if space time block coding is used. Neither DCM nor STBC shall be applied if(#15493) both the DCM field and STBC field are set to 1.<br>Set to 0 otherwise. |
| | B10 | Beamformed (#16038) | 1 | Set to 1 if a beamforming steering matrix is applied to the waveform in an SU transmission.<br>Set to 0 otherwise. |
| | B11-B12 | Pre-FEC Padding Factor | 2 | Indicates the pre-FEC padding factor.<br>Set to 0 to indicate a pre-FEC padding factor of 4<br>Set to 1 to indicate a pre-FEC padding factor of 1<br>Set to 2 to indicate a pre-FEC padding factor of 2<br>Set to 3 to indicate a pre-FEC padding factor of 3 |
| | B13 | PE Disambiguity | 1 | Indicates PE disambiguity(#16274) as defined in 28.3.12 (Packet extension). |
| | B14 | Reserved | 1 | Reserved and set to 1 |
| | B15 | Doppler | 1 | Set to 1 if one of the following applies:<br>The number of OFDM symbols in the Data field is larger than the signaled midamble periodicity plus 1 and the midamble is present<br>The number of OFDM symbols in the Data field is less than or equal to the signaled midamble periodicity plus 1 (see 28.3.11.16 Midamble), the midamble is not present, but the channel is fast varying. It recommends that midamble may be used for the PPDUs of the reverse link.<br>Set to 0 otherwise. |
| | B16-B19 | CRC | 4 | CRC for bits 0 41 of the HF-SIG-A field (see 28.3.10.7.3 (CRC computation)). Bits 0-41 of the HE-SIG-A field correspond to bits 0-25 of HE-SIG-A1 followed by bits 0-15 of HF-SIG-A2). |
| | B20-B25 | Tail | 6 | Used to terminate tire trellis of the convolutional decoder.<br>Set to 0. |

In addition, the HE-SIG-A field of the HE MU PPDU may be defined as follows.

TABLE 2

| Two Parts of HE-SIG-A | Bit | Field | Number of bits | Description |
|---|---|---|---|---|
| HF-SIG-A1 | B0 | UL/DL | 1 | Indicates whether the PPDU is sent UL or DL. Set to the value indicated by the TXVECTOR parameter UPLINK_FLAG. (#16805 )<br>NOTE-The TDLS peer can identify the TDLS frame by To DS and From DS fields in the MAC header of tire MPDU. |
| | B1-B3 | SIGB MCS | 3 | Indicates the MCS of the HE-SIG-B field:<br>Set to 0 for MCS 0<br>Set to 1 for MCS 1<br>Set to 2 for MCS 2<br>Set to 3 for MCS 3<br>Set to 4 for MCS 4<br>Set to 5 for MCS 5<br>The values 6 and 7 are reserved |

TABLE 2-continued

| Two Parts of HE-SIG-A | Bit | Field | Number of bits | Description |
|---|---|---|---|---|
| | B4 | SIGB DCM | 1 | Set to 1 indicates that the HE-SIG-B is modulated with DCM for the MCS.<br>Set to 0 indicates that the HE-SIG-B is not modulated with DCM for the MCS.<br>NOTE-DCM is only applicable to MCS 0, MCS 1, MCS 3, and MCS 4. |
| | B5-B10 | BSS Color | 6 | The BSS Color field is an identifier of the BSS.<br>Set to the value of the TXVECTOR parameter BSS_COLOR. |
| | B11-B14 | Spatial Reuse | 4 | Indicates whether or not spatial reuse is allowed during the transmission of this PPDU(#16806).<br>Set to the value of the SPATIAL_REUSE parameter of the TXVECTOR, which contains a value from Table 28-21 (Spatial Reuse field encoding for an HE SU PPDU, HE ER SU PPDU, and HE MU PPDU) (see 27.11.6 (SPATIAL_REUSE)).<br>Set to SRP_DISALLOW to prohibit SRP-based spatial reuse during Uris PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B15-B17 | Bandwidth | 3 | Set to 0 for 20 MHz.<br>Set to 1 for 40 MHz.<br>Set to 2 for 80 MHz non-preamble puncturing mode.<br>Set to 3 for 160 MHz and 80 + 80 MHz non-preamble puncturing mode.<br>If the SIGB Compression field is 0:<br>Set to 4 for preamble puncturing in 80 MHz, where hr the preamble only the secondary 20 MHz is punctured.<br>Set to 5 for preamble puncturing in 80 MHz, where hr the preamble only one of the two 20 MHz sub-channels in secondary 40 MHz is punctured.<br>Set to 6 for preamble puncturing hi 160 MHz or 80 + 80 MHz, where hr the primary 80 MHz of the preamble only the secondary 20 MHz is punctured.<br>Set to 7 for preamble puncturing hi 160 MHz or 80 + 80 MHz, where in the primary 80 MHz of the preamble the primary 40 MHz is present.<br>IT the SIGB Compression field is 1 then values 4-7 are reserved. |
| | B18-B21 | Number Of HE-SIG-B Symbols Or MU-MIMO Users | 4 | If the HE-SIG-B Compression field is set to 0, indicates the number of OFDM symbols in the HE-SIG-B field:(#15494)<br>Set to the number of OFDM symbols in the HE-SIG-B field minus 1 if the number of OFDM symbols in the HE-SIG-B field is less than 16;<br>Set to 15 to indicate that the number of OFDM symbols in the HE-SIG-B field is equal to 16 if Longer Than 16 HE SIG-B OFDM Symbols Support subfield of the HE Capabilities element transmitted by at least one recipient STA is 0;<br>Set to 15 to indicate that the number of OFDM symbols hi the HE-SIG-B field is greater than or equal to 16 if the Longer Than 16 HE SIG-B OFDM Symbols Support subfield of the HE Capabilities element transmitted by all the recipient STAs are 1 and if the HE-SIG-B data rate is less than MCS 4 without DCM. The exact number of OFDM symbols in the HE-SIG-B field is calculated based on the number of User fields in the HE-SIG-B content channel which is hrdicated by HE-SIG-B common field in this case.<br>If tire HE-SIG-B Compression field is set to 1, indicates the number of MU-MIMO users and is set to the number of NU-MIMO users minus 1 (#15495). |
| | B22 | SIGB Compression | 1 | Set to 0 if the Common field in HE-SIG-B is present.<br>Set to 1 if the Common field in HE-SIG-B is not present. (#16159) |
| | B23-B24 | GI + LTF Size | 2 | Indicates the GI duration and HE-LTF size:<br>Set to 0 to indicate a 4× HE-LTF and 0.8 µs GI<br>Set to 1 to indicate a 2× HE-LTF and 0.8 µs GI<br>Set to 2 to indicate a 2× HE-LTF and 1.6 µs GI<br>Set to 3 to indicate a 4× HE-LTF and 3.2 µs GI |

TABLE 2-continued

| Two Parts of HE-SIG-A | Bit | Field | Number of bits | Description |
|---|---|---|---|---|
| | B25 | Doppler | 1 | Set to 1 if one of the following applies:<br>The number of OFDM symbols in the Data field is larger than the signaled midamble periodicity plus 1 and the midamble is present<br>The number of OFDM symbols in the Data field is less than or equal to the signaled midamble periodicity plus 1 (see 28.3.11.16 Midamble), the midamble is not present, but the channel is fast varying. It recommends that midamble may be used for the PPDUs of the reverse link.<br>Set to 0 otherwise. |
| HE-SIG-A2 | B0-B6 | TXOP | 7 | Set to 127 to indicate no duration information if(#15496) TXVECTOR parameter TXOP_DURATION is set to UNSPECIFIED.<br>Set to a value less than 127 to indicate duration information for NAV setting and protection of the TXOP as follows:<br>If TXVECTOR parameter TXOP_DURATION is less than 512, then B0 is set to 0 and B1-B6 is set to floor(TXOP_DURATION/8)(#16277).<br>Otherwise, B0 is set to 1 and B1-B6 is set to floor ((TXOP_DURATION-512)/128)(#16277).<br>where(#16061)<br>B0 indicates the TXOP length granularity. Set to 0 for 8 μs: otherwise set to 1 for 128 μs.<br>B1-B6 indicates the scaled value of the TXOP_DURATION |
| | B7 | Reserved | 1 | Reserved and set to 1 |
| | B8-B10 | Number of HE-LTF Symbols And Midamble Periodicity | | If the Doppler field is set to 0(#15497), indicates the number of HE-LTF symbols:<br>Set to 0 for 1 HE-LTF symbol<br>Set to 1 for 2 HE-LTF symbols<br>Set to 2 for 4 HE-LTF symbols<br>Set to 3 for 6 HE-LTF symbols<br>Set to 4 for 8 HE-LTF symbols<br>Other values are reserved.<br>if the Doppler field is set to 1(#15498), B8-B9 indicates the number of HE-LTF symbols(#16056) and B10 indicates midamble periodicity:<br>B8-B9 is encoded as follows:<br>0 indicates 1 HE-LTF symbol<br>1 indicates 2 HE-LTF symbols<br>2 indicates 4 HE-LTF symbols<br>3 is reserved<br>B10 is set to 0 if the TXVECTOR parameter MIDAMBLE_PERIODICITY is 10 and set to 1 if the TXVECTOR parameter PREAMBLE_PERIODICITY is 20. |
| | B11 | LDPC Extra Symbol Segment | 1 | Indication of the presence of the extra OFDM symbol segment for LDPC.<br>Set to 1 if an extra OFDM symbol segment for LDPC is present.<br>Set to 0 otherwise. |
| | B12 | STBC | 1 | In an HE MU PPDU where each RU includes no more than 1 user, set to 1 to indicate all RUs are STBC encoded in the payload, set to 0 to indicate all RUs are not STBC encoded in the payload.<br>STBC does not apply to HE-SIG-B.<br>STBC is not applied if one or more RUs are used for MU-MIMO allocation.(#15661) |
| | B13-B14 | Pre-FEC Padding Factor | 2 | Indicates the pre-FEC padding factor.<br>Set to 0 to indicate a pre-FEC padding factor of 4<br>Set to 1 to indicate a pre-FEC padding factor of 1<br>Set to 2 to indicate a pre-FEC padding factor of 2<br>Set to 3 to indicate a pre-FEC padding factor of 3 |
| | B15 | PE Disambiguity | 1 | Indicates PE disambiguity(#16274) as defined in 28.3.12 (Packet extension). |
| | B16-B19 | CRC | 4 | CRC for bits 0-41 of the HF-SIG-A field (see 28.3.10.7.3 (CRC computation)). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder.<br>Set to 0. |

In addition, the HE-SIG-A field of the HE TB PPDU may be defined as follows.

TABLE 3

| Two Parts of HE-SIG-A | Bit | Field | Number of bits | Description |
|---|---|---|---|---|
| HE-SIG-A1 | B0 | Format | 1 | Differentiate an HE SU PPDU and HE ER SU PPDU from an HE TB PPDU: Set to 0 for an HE TB PPDU |
| | B1-B6 | BSS Color | 6 | The BSS Color field is an identifier of the BSS. Set to the value of the TXVECTOR parameter BSS_COLOR. |
| | B7-B10 | Spatial Reuse 1 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz, or 80 MHz then this Spatial Reuse field applies to the first 20 MHz subband. if the Bandwidth field indicates 160/80 + 80 MHz then this Spatial Reuse field applies to the first 40 MHz subband of the 160 MHz operating band. Set to the value of the SPATIAL_REUSE(1) parameter of the TXVECTOR, which contains a value from Table 28-22 (Spatial Reuse field encoding for an HE TB PPDU) for an HE TB PPDU (see 27.11.6 (SPATIAL_REUSE)) Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B11-B14 | Spatial Reuse 2 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz, or 80 MHz: This Spatial Reuse field applies to the second 20 MHz subband. If(#Ed) the STA operating channel width is 20 MHz, then this field is set to the same value as Spatial Reuse 1 field. If(#Ed) the STA operating channel width is 40 MHz in the 2.4 GHz band, this field is set to the same value as Spatial Reuse 1 field. If the Bandwidth field indicates 160/80 + 80 MHz the this Spatial Reuse field applies to the second 40 MHz subband of the 160 MHz operating band. Set to the value of the SPATIAL_REUSE(2) parameter of the TXVECTOR, which contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B15-B18 | Spatial Reuse 3 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz or 80 MHz: This Spatial Reuse field applies to the third 20 MHz subband. If(#Ed) the STA operating channel width is 20 MHz or 40 MHz, this field is set to the same value as Spatial Reuse 1 field. |

TABLE 3-continued

| Two Parts of HE-SIG-A | Bit | Field | Number of bits | Description |
|---|---|---|---|---|
| | | | | If the Bandwidth field indicates 160/80 + 80 MHz: This Spatial Reuse field applies to the third 40 MHz subband of the 160 MHz operating band. If(#Ed) the STA operating channel width is 80 + 80 MHz, this field is set to the same value as Spatial Reuse 1 field. Set to the value of the SPATIAL_REUSE(3) parameter of the TXVECTOR, which contains a value from Table 28-22 (Spatial Reuse field encoding for an HE TB PPDU) for an HE TB PPDU (see 27.11.6 (SPATIAL_REUSE)) Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B19-B22 | Spatial Reuse 4 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz or 80 MHz: This Spatial Reuse field applies to the fourth 20 MHz subband. If(#Ed) the STA operating channel width is 20 MHz, then this field is set to the same value as Spatial Reuse 1 field. If(#Ed) the STA operating channel width is 40 MHz, then thiss field is set to the same value as Spatial Reuse 2 field. If the Bandwidth field indicates 160/80 + 80 MHz: This Spatial Reuse field applies to the fourth 40 MHz subband of the 160 MHz operating band. If the STA operating channel width is 80 + 80 MHz, then this field is set to same value as Spatial Reuse 2 field. Set to the value of the SPATIAL_REUSE(4) parameter of the TXVECTOR, winch contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B23 | Reserved | 1 | Reserved and set to 1. NOTE-Unlike other Reserved fields in HE-SIG-A of the HE TB PPDU, B23 does not have a corresponding bit in the Trigger frame. |
| | B24-B25 | Bandwidth | 2 | (#16003)Set to 0 for 20 MHz Set to 1 for 40 MHz Set to 2 for 80 MHz Set to 3 for 160 MHz and 80 + 80 MHz |
| HE-SIG-A2 | B0-B6 | TXOP | 7 | Set to 127 to indicate no duration information if(#15499) TXVECTOR parameter TXOP_DURATION is set to UNSPECIFIED. Set to a value less than 127 to indicate duration information for NAV setting and protection of the TXOP as follows: If TXVECTOR parameter TXOP_DURATION is less than 512, then B0 is set to 0 and B1-B6 is set to floor(TXOP_DURATION/8)(#16277). Otherwise. B0 is set to 1 and B1-B6 is set to floor ((TXOP_DURATION − 512 ) /128)(#16277). where(#16061) B0 indicates the TXOP length granularity. Set to 0 for 8 μs; otherwise set to 1 for 128 μs. B1-B6 indicates the scaled value of the TXOP_DURATION |

TABLE 3-continued

| Two Parts of HE-SIG-A | Bit | Field | Number of bits | Description |
|---|---|---|---|---|
| | B7-B15 | Reserved | 9 | Reserved and set to value indicated in the UL HE-SIG-A2 Reserved subfield in the Trigger frame. |
| | B16-B19 | CRC | 4 | CRC of bits 0-41 of the HE-SIG-A field. See 28.3.10.7.3 (CRC computation). Bits 0-41 of the HE-SIG-A field correspond to bits 0-25 of HE-SIG-A1 followed by bits 0-15 of HE-SIG-A2) |
| | B20-B25 | Tail | 6 | Used to termmate the trellis of the convolutional decoder. Set to 0. |

A HE-SIG-B (740) may be included only in the case of the PPDU for the multiple users (MUs) as described above. Principally, a HE-SIG-A (750) or a HE-SIG-B (760) may include resource allocation information (alternatively, virtual resource allocation information) for at least one receiving STA.

Figure 8:
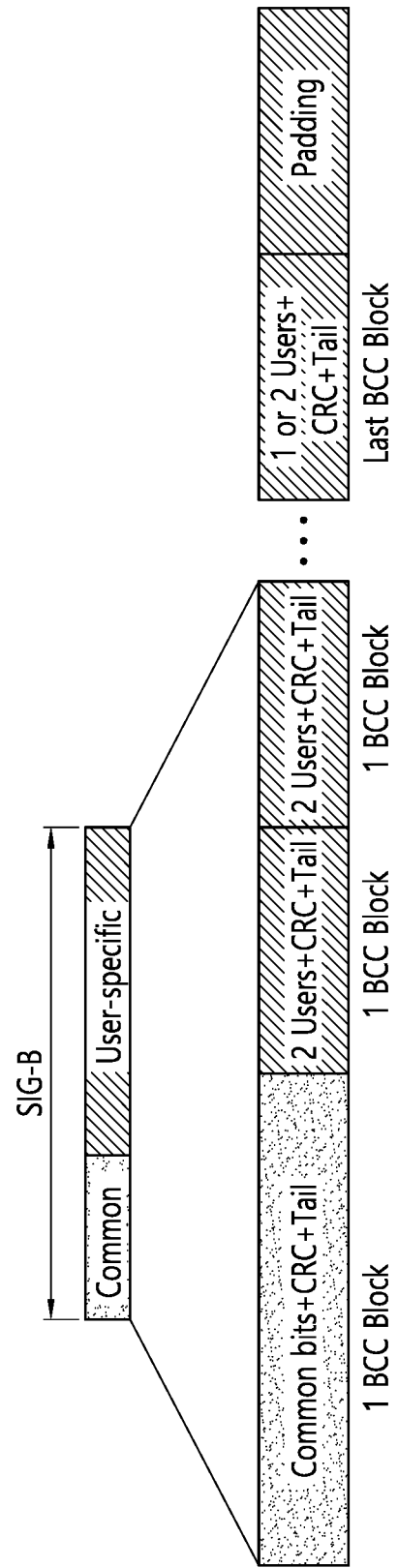
FIG. 8 is a block diagram illustrating one example of HE-SIG-B according to an embodiment.

FIG. 8 is a block diagram illustrating one example of HE-SIG-B according to an embodiment.

As illustrated in FIG. 8, the HE-SIG-B field includes a common field at a frontmost part and the corresponding common field is separated from a field which follows therebehind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 8.

A previous field of the HE-SIG-B (740) may be transmitted in a duplicated form on a MU PPDU. In the case of the HE-SIG-B (740), the HE-SIG-B (740) transmitted in some frequency band (e.g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B (740) in a specific frequency band (e.g., the second frequency band) is duplicated with the HE-SIG-B (740) of another frequency band (e.g., the fourth frequency band). Alternatively, the HE-SIG B (740) may be transmitted in an encoded form on all transmission resources. A field after the HE-SIG B (740) may include individual information for respective receiving STAs receiving the PPDU.

The HE-STF (750) may be used for improving automatic gain control estimation in a multiple input multiple output (MIMO) environment or an OFDMA environment.

The HE-LTF (760) may be used for estimating a channel in the MIMO environment or the OFDMA environment.

The size of fast Fourier transform (FFT)/inverse fast Fourier transform (IFFT) applied to the HE-STF (750) and the field after the HE-STF (750), and the size of the FFT/IFFT applied to the field before the HE-STF (750) may be different from each other. For example, the size of the FFT/IFFT applied to the HE-STF (750) and the field after the HE-STF (750) may be four times larger than the size of the FFT/IFFT applied to the field before the HE-STF (750).

For example, when at least one field of the L-STF (700), the L-LTF (710), the L-SIG (720), the HE-SIG-A (730), and the HE-SIG-B (740) on the PPDU of FIG. 7 is referred to as a first field, at least one of the data field (770), the HE-STF (750), and the HE-LTF (760) may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy wireless LAN system. That is, the FFT/IFFT having the size may be applied, which is N(=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N(=4) times shorter than the IDFT/DFT period applied to each data symbol of the second field. That is, the IDFT/DFT length applied to each symbol of the first field of the HE PPDU may be expressed as 3.2 μs and the IDFT/DFT length applied to each symbol of the second field of the HE PPDU may be expressed as 3.2 μs*4 (=12.8 μs). The length of the OFDM symbol may be a value acquired by adding the length of a guard interval (GI) to the IDFT/DFT length. The length of the GI may have various values such as 0.4 μs, 0.8 μs, 1.6 μs, 2.4 μs, and 3.2 μs.

For simplicity in the description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user (e.g., a receiving station) may receive the HE-SIG-A (730) and may be instructed to receive the downlink PPDU based on the HE-SIG-A (730). In this case, the STA may perform decoding based on the FFT size changed from the HE-STF (750) and the field after the HE-STF (750). On the contrary, when the STA may not be instructed to receive the downlink PPDU based on the HE-SIG-A (730), the STA may stop the decoding and configure a network allocation vector (NAV). A cyclic prefix (CP) of the HE-STF (750) may have a larger size than the CP of another field and the during the CP period, the STA may perform the decoding for the downlink PPDU by changing the FFT size.

Hereinafter, in the embodiment of the present disclosure, data (alternatively, or a frame) which the AP transmits to the STA may be expressed as a term called downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the wireless LAN system to which the embodiment of the present description is applied, the total bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, subchannels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, subchannel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, subchannels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, subchannel) allocated for the UL MU OFDMA transmission.

In the legacy wireless LAN system, which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, in case the uplink transmission performed by each of the multiple STAs (e.g., non-AP STAs) is performed within the frequency domain, the AP may allocate different frequency resources respective to each of the multiple STAs as uplink transmission resources based on OFDMA. Additionally, as described above, the frequency resources each being different from one another may correspond to different subbands (or subchannels) or different resource units (RUs).

The different frequency resources respective to each of the multiple STAs are indicated through a trigger frame.

Figure 9:
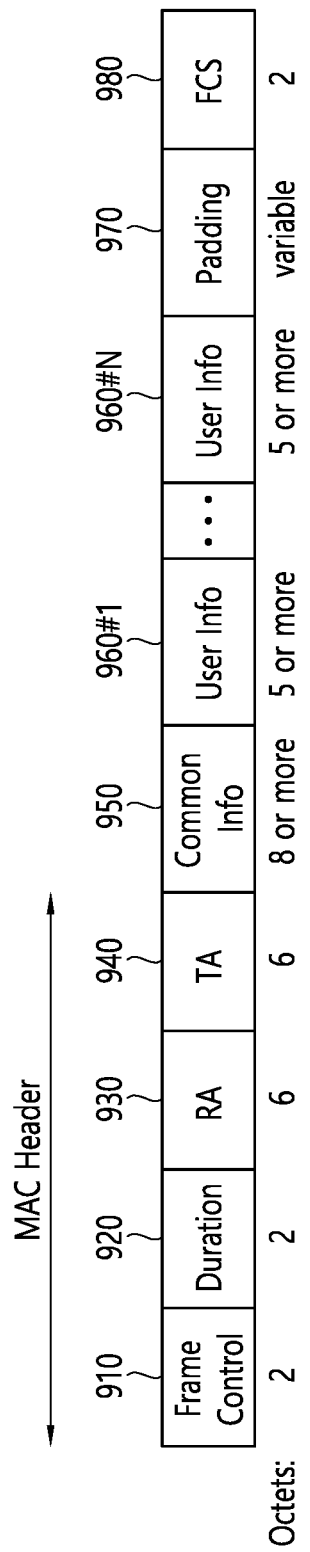
FIG. 9 illustrates an example of a trigger frame.

FIG. 9 illustrates an example of a trigger frame. The trigger frame of FIG. 9 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 9 may be partially omitted, or other fields may be added. Moreover, the length of each field may be varied differently as shown in the drawing.

A Frame Control field (910) shown in FIG. 9 may include information related to a version of the MAC protocol and other additional control information, and a Duration field (920) may include time information for configuring a NAV or information related to an identifier (e.g., AID) of the user equipment.

Also, the RA field (930) includes address information of a receiving STA of the corresponding trigger frame and may be omitted if necessary. The TA field (940) includes address information of an STA triggering the corresponding trigger frame (for example, an AP), and the common information field (950) includes common control information applied to a receiving STA that receives the corresponding trigger frame. For example, a field indicating the length of the L-SIG field of the UL PPDU transmitted in response to the corresponding trigger frame or information controlling the content of the SIG-A field (namely, the HE-SIG-A field) of the UL PPDU transmitted in response to the corresponding trigger frame may be included. Also, as common control information, information on the length of the CP of the UP PPDU transmitted in response to the corresponding trigger frame or information on the length of the LTF field may be included.

Also, it is preferable to include a per user information field (960 #1 to 960 #N) corresponding to the number of receiving STAs that receive the trigger frame of FIG. 9. The per user information field may be referred to as an "RU allocation field".

Also, the trigger frame of FIG. 9 may include a padding field (970) and a frame check sequence field (980).

It is preferable that each of the per user information fields (960 #1 to 960 #N) shown in FIG. 9 includes a plurality of subfields.

Figure 10:
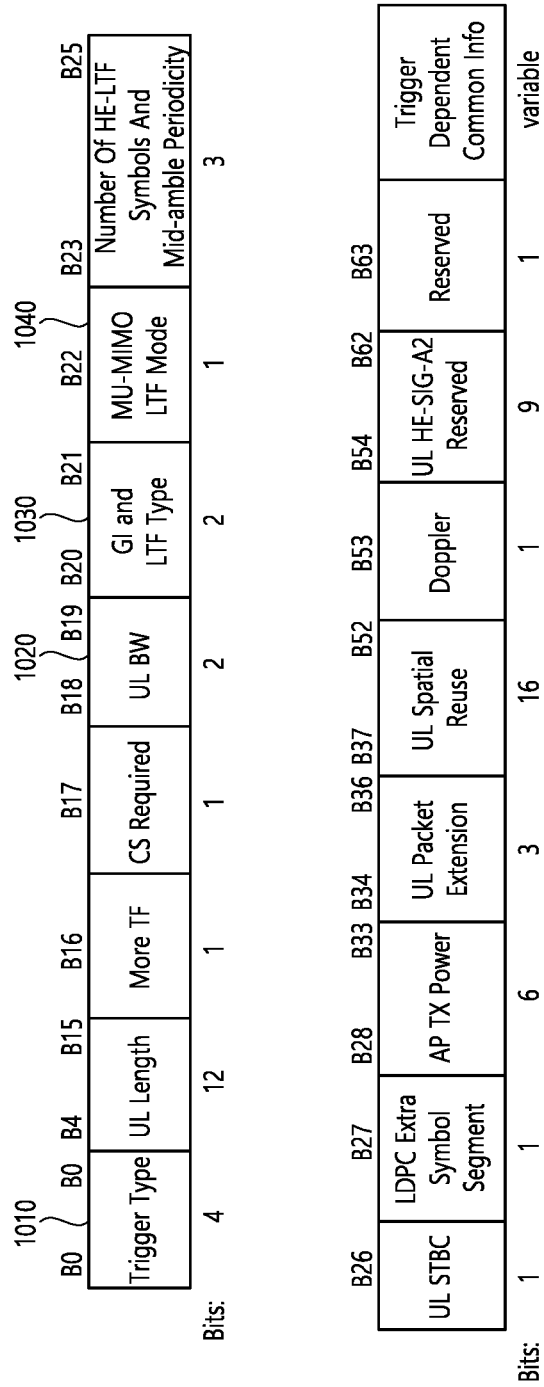
FIG. 10 illustrates an example of a common information field.

FIG. 10 illustrates an example of a common information field. Among the subfields of FIG. 10, some may be omitted, and other additional subfields may also be added. Additionally, the length of each of the subfields shown in the drawing may be varied.

The trigger type field (1010) of FIG. 10 may indicate a trigger frame variant and encoding of the trigger frame variant. The trigger type field (1010) may be defined as follows.

TABLE 4

| Trigger Type subfield value | Trigger frame variant |
| --- | --- |
| 0 | Basic |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8-15 | Reserved |

The UL BW field (1020) of FIG. 10 indicates bandwidth in the HE-SIG-A field of an HE Trigger Based (TB) PPDU. The UL BW field (1020) may be defined as follows.

TABLE 5

| ULBW subfield value | Description |
| --- | --- |
| 0 | 20 MHz |
| 1 | 40 MHz |
| 2 | 80 MHz |
| 3 | 80 + 80 MHz or 160 MHz |

The Guard Interval (GI) and LTF type fields (1030) of FIG. 10 indicate the GI and HE-LTF type of the HE TB PPDU response. The GI and LTF type field (1030) may be defined as follows.

TABLE 6

| GI And LTF field value | Description |
| --- | --- |
| 0 | 1× HE-LTF + 1.6 μs GI |
| 1 | 2× HE-LTF + 1.6 μs GI |
| 2 | 4× HE-LTF + 3.2 μs GI(#15968) |
| 3 | Reserved |

Also, when the GI and LTF type fields (1030) have a value of 2 or 3, the MU-MIMO LTF mode field (1040) of FIG. 10 indicates the LTF mode of a UL MU-MIMO HE TB PPDU response. At this time, the MU-MIMO LTF mode field (1040) may be defined as follows.

If the trigger frame allocates an RU that occupies the whole HE TB PPDU bandwidth and the RU is allocated to one or more STAs, the MU-MIMO LTF mode field (1040) indicates one of an HE single stream pilot HE-LTF mode or an HE masked HE-LTF sequence mode.

If the trigger frame does not allocate an RU that occupies the whole HE TB PPDU bandwidth and the RU is not allocated to one or more STAs, the MU-MIMO LTF mode field (1040) indicates the HE single stream pilot HE-LTF mode. The MU-MIMO LTF mode field (1040) may be defined as follows.

TABLE 7

| MU-MIMO LTF subfield value | Description |
| --- | --- |
| 0 | HE single stream pilot HE-LTF mode |
| 1 | HE masked HE-LTF sequence mode |

Figure 11:
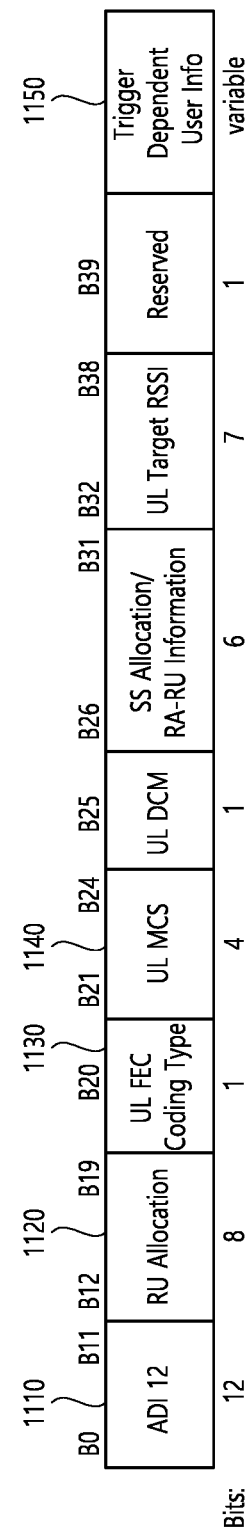
FIG. 11 illustrates an example of a subfield being included in a per user information field.

FIG. 11 illustrates an example of a subfield being included in a per user information field. Among the subfields of FIG. 11, some may be omitted, and other additional subfields may also be added. Additionally, the length of each of the subfields shown in the drawing may be varied.

The User Identifier field of FIG. 11 (or AID12 field, 1110) indicates the identifier of an STA (namely, a receiving STA) corresponding to per user information, where an example of the identifier may be the whole or part of the AID.

Also, an RU Allocation field (1120) may be included. In other words, when a receiving STA identified by the User Identifier field (1110) transmits a UL PPDU in response to the trigger frame of FIG. 9, the corresponding UL PPDU is transmitted through an RU indicated by the RU Allocation field (1120). In this case, it is preferable that the RU indicated by the RU Allocation field (1120) indicates the RUs shown in FIGS. 4, 5, and 6. A specific structure of the RU Allocation field (1120) will be described later.

The subfield of FIG. 11 may include a (UL FEC) coding type field (1130). The coding type field (1130) may indicate the coding type of an uplink PPDU transmitted in response to the trigger frame of FIG. 9. For example, when BCC coding is applied to the uplink PPDU, the coding type field (1130) may be set to '1', and when LDPC coding is applied, the coding type field (1130) may be set to '0'.

Additionally, the subfield of FIG. 11 may include a UL MCS field (1140). The MCS field (1140) may indicate an MCS scheme being applied to the uplink PPDU that is transmitted in response to the trigger frame of FIG. 9.

Also, the subfield of FIG. 11 may include a Trigger Dependent User Info field (1150). When the Trigger Type field (1010) of FIG. 10 indicates a basic trigger variant, the Trigger Dependent User Info field (1150) may include an MPDU MU Spacing Factor subfield (2 bits), a TID Aggregate Limit subfield (3 bits), a Reserved field (1 bit), and a Preferred AC subfield (2 bits).

Hereinafter, the present disclosure proposes an example of improving a control field included in a PPDU. The control field improved according to the present disclosure includes a first control field including control information required to interpret the PPDU and a second control field including control information for demodulate the data field of the PPDU. The first and second control fields may be used for various fields. For example, the first control field may be the HE-SIG-A (730) of FIG. 7, and the second control field may be the HE-SIG-B (740) shown in FIGS. 7 and 8.

Hereinafter, a specific example of improving the first or the second control field will be described.

In the following example, a control identifier inserted to the first control field or a second control field is proposed. The size of the control identifier may vary, which, for example, may be implemented with 1-bit information.

The control identifier (for example, a 1-bit identifier) may indicate whether a 242-type RU is allocated when, for example, 20 MHz transmission is performed. As shown in FIGS. 4 to 6, RUs of various sizes may be used. These RUs may be divided broadly into two types. For example, all of the RUs shown in FIGS. 4 to 6 may be classified into 26-type RUs and 242-type RUs. For example, a 26-type RU may include a 26-RU, a 52-RU, and a 106-RU while a 242-type RU may include a 242-RU, a 484-RU, and a larger RU.

The control identifier (for example, a 1-bit identifier) may indicate that a 242-type RU has been used. In other words, the control identifier may indicate that a 242-RU, a 484-RU, or a 996-RU is included. If the transmission frequency band in which a PPDU is transmitted has a bandwidth of 20 MHz, a 242-RU is a single RU corresponding to the full bandwidth of the transmission frequency band (namely, 20 MHz). Accordingly, the control identifier (for example, 1-bit identifier) may indicate whether a single RU corresponding to the full bandwidth of the transmission frequency band is allocated.

For example, if the transmission frequency band has a bandwidth of 40 MHz, the control identifier (for example, a 1-bit identifier) may indicate whether a single RU corresponding to the full bandwidth (namely, bandwidth of 40 MHz) of the transmission frequency band has been allocated. In other words, the control identifier may indicate whether a 484-RU has been allocated for transmission in the frequency band with a bandwidth of 40 MHz.

For example, if the transmission frequency band has a bandwidth of 80 MHz, the control identifier (for example, a 1-bit identifier) may indicate whether a single RU corresponding to the full bandwidth (namely, bandwidth of 80 MHz) of the transmission frequency band has been allocated. In other words, the control identifier may indicate whether a 996-RU has been allocated for transmission in the frequency band with a bandwidth of 80 MHz.

Various technical effects may be achieved through the control identifier (for example, 1-bit identifier).

First of all, when a single RU corresponding to the full bandwidth of the transmission frequency band is allocated through the control identifier (for example, a 1-bit identifier), allocation information of the RU may be omitted. In other words, since only one RU rather than a plurality of RUs is allocated over the whole transmission frequency band, allocation information of the RU may be omitted deliberately.

Also, the control identifier may be used as signaling for full bandwidth MU-MIMO. For example, when a single RU is allocated over the full bandwidth of the transmission frequency band, multiple users may be allocated to the corresponding single RU. In other words, even though signals for each user are not distinctive in the temporal and spatial domains, other techniques (for example, spatial multiplexing) may be used to multiplex the signals for multiple users in the same, single RU. Accordingly, the control identifier (for example, a 1-bit identifier) may also be used to indicate whether to use the full bandwidth MU-MIMO described above.

The common field included in the second control field (HE-SIG-B, 740) may include an RU allocation subfield. According to the PPDU bandwidth, the common field may include a plurality of RU allocation subfields (including N RU allocation subfields). The format of the common field may be defined as follows.

TABLE 8

| Subfield | Number of bits | Description |
|---|---|---|
| RU Allocation | N × 8 | Indicates the RU assignment to be used in the data portion in the frequency domain. It also indicates the number of users in each RU. For RUs of size greater than or equal to 106-tones that support MU-MIMO, it indicates the number of users multiplexed using MU-MIMO. Consists of N RU Allocation subfields: N = 1 for a 20 MHz and a 40 MHz HE MU PPDU N = 2 for an 80 MHz HE MU PPDU N = 4 for a 160 MHz or 80 + 80 MHz HE MU PPDU |
| Center 26-tone RU | 1 | This field is present only if(#15510) the value of the Bandwidth field of HE-SIG-A field in an HE MU PPDU is set to greater than 1. If the Bandwidth field of the HE-SIG-A field in an HE MU PPDU is set to 2, 4 or 5 for 80 MHz: Set to 1 to indicate that a user is allocated to the center 26-tone RU (see Figure 28-7 (RU locations in an 80 MHz HE PPDU(#16528))); otherwise, set to 0. The same value is applied to both HE-SIG-B content channels. If the Bandwidth field of the HE-SIG-A field in an HE MU PPDU is set to 3, 6 or 7 for 160 MHz or 80 + 80 MHz: For HE-SIG-B content channel 1, set to 1 to indicate that a user is allocated to the center 26-tone RU of the lower frequency 80 MHz; otherwise, set to 0. For HE-SIG-B content channel 2, set to 1 to indicate that a user is allocated to the center 26-tone RU of the higher frequency 80 MHz; otherwise, set to 0. |
| CRC | 4 | See 28.3.10.7.3 (CRC computation) |
| Tail | 6 | Used to terminate the trellis of the convolutional decoder. Set to 0 |

The RU allocation subfield included in the common field of the HE-SIG-B may be configured with 8 bits and may indicate as follows with respect to 20 MHz PPDU bandwidth. RUs to be used as a data portion in the frequency domain are allocated using an index for RU size and disposition in the frequency domain. The mapping between an 8-bit RU allocation subfield for RU allocation and the number of users per RU may be defined as follows.

TABLE 9

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |
| 00001001 | 52 | | 26 | 26 | 26 | 26 | 26 | 52 | | 1 |
| 00001010 | 52 | | 26 | 26 | 26 | 52 | | 26 | 26 | 1 |
| 00001011 | 52 | | 26 | 26 | 26 | 52 | | 52 | | 1 |
| 00001100 | 52 | | 52 | | 26 | 26 | 26 | 26 | 26 | 1 |
| 00001101 | 52 | | 52 | | 26 | 26 | 26 | 52 | | 1 |
| 00001110 | 52 | | 52 | | 26 | 52 | | 26 | 26 | 1 |
| 00001111 | 52 | | 52 | | 26 | 52 | | 52 | | 1 |
| 00010$y_2y_1y_0$ | 52 | | 52 | | — | | 106 | | | 8 |
| 00011$y_2y_1y_0$ | | 106 | | | — | 52 | | 52 | | 8 |
| 00100$y_2y_1y_0$ | 26 | 26 | 26 | 26 | 26 | | 106 | | | 8 |
| 00101$y_2y_1y_0$ | 26 | 26 | | 52 | 26 | | 106 | | | 8 |
| 00110$y_2y_1y_0$ | 52 | | 26 | 26 | 26 | | 106 | | | 8 |
| 00111$y_2y_1y_0$ | 52 | | | 52 | 26 | | 106 | | | 8 |
| 01000$y_2y_1y_0$ | | 106 | | | 26 | 26 | 26 | 26 | 26 | 8 |
| 01001$y_2y_1y_0$ | | 106 | | | 26 | 26 | 26 | 52 | | 8 |
| 01010$y_2y_1y_0$ | | 106 | | | 26 | 52 | | 26 | 26 | 8 |
| 01011$y_2y_1y_0$ | | 106 | | | 26 | 52 | | 52 | | 8 |
| 0110$y_1y_0z_1z_0$ | | 106 | | | — | | 106 | | | 16 |
| 01110000 | 52 | | | 52 | | | 52 | 52 | | 1 |
| 01110001 | | | | | 242-tone RU empty | | | | | 1 |
| 01110010 | | | | 484-tone RU with zero User fields indicated in this RU Allocation subfield of the HE-SIG-B content channel | | | | | | 1 |
| 01110011 | | | | 996-tone RU with zero User fields indicated in this RU Allocation subfield of the HE-SIG-B content channel | | | | | | 1 |

TABLE 9-continued

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| $011101x_1x_0$ | | | | | Reserved | | | | | 4 |
| $01111y_2y_1y_0$ | | | | | Reserved | | | | | 8 |
| $10y_2y_1y_0z_2z_1z_0$ | | 106 | | | 26 | | 106 | | | 64 |
| $11000y_2y_1y_0$ | | | | | 242 | | | | | 8 |
| $11001y_2y_1y_0$ | | | | | 484 | | | | | 8 |
| $11010y_2y_1y_0$ | | | | | 996 | | | | | 8 |
| $11011y_2y_1y_0$ | | | | | Reserved | | | | | 8 |
| $111x_4x_3x_2x_1x_0$ | | | | | Reserved | | | | | 32 |

If(#Ed) signaling RUs of size greater than 242 subcarriers, $y_2y_1y_0$ = 000-111 indicates number of User fields in the HE-SIG-B content channel that contains the corresponding 8-bit RU Allocation subfield. Otherwise, $y_2y_1y_0$ = 000-111 indicates number of STAs multiplexed in the 106-tone RU, 242-tone RU or the lower frequency 106-tone RU if there are two 106-tone RUs and one 26-tone RU is assigned between two 106-tone RUs. The binary vector $y_2y_1y_0$ indicates $2^2 \times y_2 + 2^1 \times y_1 + y_0 + 1$ STAs multiplexed the RU.
$z_2z_1z_0$ = 000-111 indicates number of STAs multiplexed in the higher frequency 106-tone RU if there are two 106-tone RUs and one 26-tone RU is assigned between two 106-tone RUs. The binary vector $z_2z_1z_0$ indicates $2^2 \times z_2 + 2^1 \times z_1 + z_0 + 1$ STAs multiplexed in the RU.
Similarly, $y_1y_0$ = 00-11 indicates number of STAs multiplexed in the lower frequency 106-tone RU. The binary vector $y_1y_0$ indicates $2^1 \times y_1 + y_0 + 1$ STAs multiplexed in the RU.
Similarly, $z_1z_0$ = 00-11 indicates the number of STAs multiplexed in the higher frequency 106-tone RU. The binary vector $z_1z_0$ indicates $2^1 \times z_1 + z_0 + 1$ STAs multiplexed in the RU.
1 to #9 (from left to the right) is ordered in increasing order of the absolute frequency.
$x_1x_0$ = 00-11, $x_4x_3x_2x_1x_0$ = 00000-11111.
'—' means no STA in that RU.

The user-specific field included in the second control field (HE-SIG-B, 740) may include a user field, a CRC field, and a Tail field. The format of the user-specific field may be defined as follows.

TABLE 10

| Subfield | Number of bits | Description |
|---|---|---|
| User field | N × 21 | The User field format for a non-MU-MIMO allocation is defined in Table 28-26 (User field format for a non-MU-MIMO allocation). The User field format for a MU-MIMO allocation is defined in Table 28-27 (User field for an MU-MIMO allocation). N = 1 if it is the last User Block field, and if there is only one user in the last User Block field. N = 2 otherwise. |
| CRC | 4 | The CRC is calculated over bits 0 to 20 for a User Block field that contains one User field, and bits 0 to 41 for a User Block field that contains two User fields. See 28.3.10.7.3 (CRC computation). |
| Tail | 6 | Used to terminate the trellis of the convolutional decoder. Set to 0. |

Also, the user-specific field of the HE-SIG-B is composed of a plurality of user fields. The plurality of user fields are located after the common field of the HE-SIG-B. The location of the RU allocation subfield of the common field and that of the user field of the user-specific field are used together to identify an RU used for transmitting data of an STA. A plurality of RUs designated as a single STA are now allowed in the user-specific field. Therefore, signaling that allows an STA to decode its own data is transmitted only in one user field.

As an example, it may be assumed that the RU allocation subfield is configured with 8 bits of 01000010 to indicate that five 26-tone RUs are arranged next to one 106-tone RU and three user fields are included in the 106-tone RU. At this time, the 106-tone RU may support multiplexing of the three users. This example may indicate that eight user fields included in the user-specific field are mapped to six RUs, the first three user fields are allocated according to the MU-MIMO scheme in the first 106-tone RU, and the remaining five user fields are allocated to each of the five 26-tone RUs.

User fields included in the user-specific field of the HE-SIG-B may be defined as described below. Firstly, user fields for non-MU-MIMO allocation are as described below.

TABLE 12

| Bit | Subfield | Number of bits | Description |
|---|---|---|---|
| B0-B10 | STA-ID | 11 | Set to a value of the element indicated from TXVECTOR parameter STA_ID_LIST (see 27.11.1 (STA_ID_LIST)). |
| B11-B13 | NSTS | 3 | Number of space-time streams. Set to the number of space-time streams minus 1. |

TABLE 12-continued

| Bit | Subfield | Number of bits | Description |
|---|---|---|---|
| B14 | Beam-formed (#16038) | 1 | Use of transmit beamforming. Set to 1 if a beamforming steering matrix is applied to the waveform in an SU transmission. Set to 0 otherwise. |
| B15-B18 | MCS | 4 | Modulation and coding scheme Set to n for MCSn, where n = 0, 1 , 2 . . . , 11 Values 12 to 15 are reserved |
| B19 | DCM | 1 | Indicates whether or not DCM is used. Set to 1 to indicate that the payload(#Ed) of the corresponding user of the HE MU PPDU is modulated with DCM for the MCS. Set to 0 to indicate that the pay load of the corresponding user of the PPDU is not modulated with DCM for the MCS. NOTE-DCM is not applied in combination with STBC.(#15664) |
| B20 | Coding | 1 | Indicates whether BCC or LDPC is used. Set to 0 for BCC Set to 1 for LDPC |

NOTE
If the STA-ID subfield is set to 2046, then the other subfields can be set to arbitrary values.(#15946)

User fields for MU-MIMO allocation are as described below.

TABLE 13

| Bit | Subfield | Number of bits | Description |
|---|---|---|---|
| B0-B10 | STA-ID | 11 | Set to a value of element indicated from TXVECTOR parameter STA_ID_LIST (see 27.11.1 (STA_ID_LIST)). |
| B11-B14 | Spatial Configuration | 4 | Indicates the number of spatial streams for a STA in an MU-MIMO allocation (see Table 28-28 (Spatial Configuration subfield encoding)). |
| B15-B18 | MCS | 4 | Modulation and coding scheme. Set to n for MCSn, where n = 0, 1, 2, . . . , 11 Values 12 to 15 are reserved |
| B19 | Reserved | 1 | Reserved and set to 0 |
| B20 | Coding | 1 | Indicates whether BCC or LDPC is used. Set to 0 for BCC Set to 1 for LDPC |

NOTE
If the STA-ID subfield is set to 2046, then the other subfields can be set to arbitrary values.(#15946)

Figure 12:
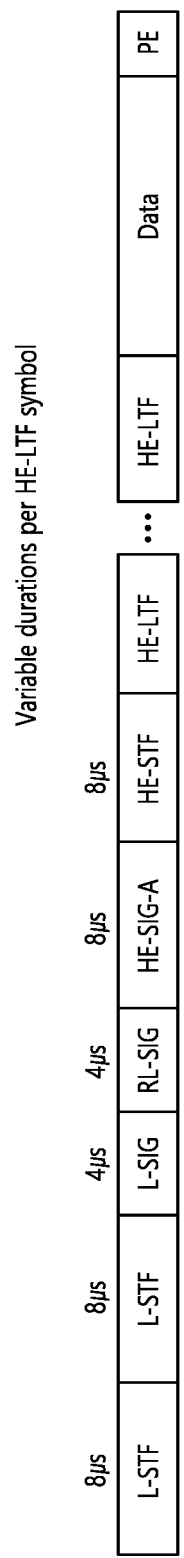
FIG. 12 illustrates one example of an HE TB PPDU.

FIG. 12 illustrates an example of an HE TB PPDU. The PPDU of FIG. 12 illustrates an uplink PPDU transmitted in response to the trigger frame of FIG. 9. At least one STA receiving a trigger frame from an AP may check the common information field and the individual user information field of the trigger frame and may transmit a HE TB PPDU simultaneously with another STA which has received the trigger frame.

As shown in the figure, the PPDU of FIG. 12 includes various fields, each of which corresponds to the field shown in FIGS. 2, 3, and 7. Meanwhile, as shown in the figure, the HE TB PPDU (or uplink PPDU) of FIG. 12 may not include the HE-SIG-B field but only the HE-SIG-A field.

1. Carrier Sense Multiple Access/Collision Avoidance (CSMA/CA)

In IEEE 802.11, communication is achieved in a shared wireless medium, and thus has a characteristic fundamentally different from a wired channel environment. For example, communication is possible based on carrier sense multiple access/collision detection (CSMA/CD) in the wired channel environment. For example, when a signal is transmitted one time in Tx, the signal is transmitted to Rx without significant signal attenuation since a channel environment does not change much. In this case, when a collision occurs in two or more signals, it is detectable. This is because power detected in Rx is instantaneously greater than power transmitted in Tx. However, in a wireless channel environment, a channel is affected by various factors (e.g., a signal may be significantly attenuated according to a distance or may instantaneously experience deep fading), carrier sensing cannot be achieved correctly in Tx as to whether a signal is properly transmitted in Rx in practice or whether a collision exists. Therefore, a distributed coordination function (DCF) which is a carrier sense multiple access/collision avoidance (CSMA/CA) mechanism is introduced in 802.11. Herein, stations (STAs) having data to be transmitted perform clear channel assessment (CCA) for sensing a medium during a specific duration (e.g., DIFS: DCF inter-frame space) before transmitting the data. In this case, if the medium is idle, the STA can transmit the data by using the medium. On the other hand, if the medium is busy, under the assumption that several STAs have already waited for the use of the medium, the data can be transmitted after waiting by a random backoff period in addition to the DIFS. In this case, the random backoff period can allow the collision to be avoidable because, under the assumption that there are several STAs for transmitting data, each STA has a different backoff interval probabilistically and thus eventually has a different transmission time. When one STA starts transmission, the other STAs cannot use the medium.

The random backoff time and the procedure will be simply described as follows. When a specific medium transitions from busy to idle, several STAs start a preparation for data transmission. In this case, to minimize a collision, the STAs intending to transmit the data select respective random backoff counts and wait by those slot times. The random backoff count is a pseudo-random integer value, and one of uniform distribution values is selected in the range of [0 CW]. Herein, CW denotes a contention window. A CW parameter takes a CWmin value as an initial value, and when transmission fails, the value is doubled. For example, if an ACK response is not received in response to a transmitted data frame, it may be regarded that a collision occurs. If the CW value has a CWmax value, the CWmax value is maintained until data transmission is successful, and when the data transmission is successful, is reset to the CWmin value. In this case, the values CW, CWmin, and CWmax are preferably maintained to $2^n-1$ for convenience of implementations and operations. Meanwhile, if the random backoff procedure starts, the STA selects the random backoff count in the [0 CW] range and thereafter continuously monitors a medium while counting down a backoff slot. In the meantime, if the medium enters a busy state, the countdown is stopped, and when the medium returns to an idle state, the countdown of the remaining backoff slots is resumed.

The very basis of CSMA/CA is carrier sense. A user equipment (UE) (or terminal) uses physical carrier sense and virtual carrier sense in order to determine whether or not a DCF medium is busy/idle. Physical carrier sense is carried out in a physical layer (PHY) and is carried out through energy detection or preamble detection. For example, when it is determined that a voltage level is measured or a preamble is read in a Rx end, a medium may be determined to be in a busy state. Virtual carrier sense is carried out through a Duration field value by configuring a network allocation vector (NAV) so that other STAs cannot transmit data.

2. PHY Procedure

A PHY transmit/receive procedure in Wi-Fi is as follows, but a specific packet configuration method may differ. For convenience, only 11n and 11ax will be taken for example, but 11g/ac also conforms to a similar procedure.

That is, in the PHY transmit procedure, a MAC protocol data unit (MPDU) or an aggregate MPDU (A-MPDU) transmitted from a MAC end is converted into a single PHY service data unit (PSDU) in a PHY end, and is transmitted by inserting a preamble, tail bits, and padding bits (optional), and this is called a PPDU.

The PHY receive procedure is usually as follows. When performing energy detection and preamble detection (L/HT/VHT/HE-preamble detection for each WiFi version), information on a PSDU configuration is obtained from a PHY header (L/HT/VHT/HE-SIG) to read a MAC header, and then data is read.

3. NAV Configuration

Figure 13:
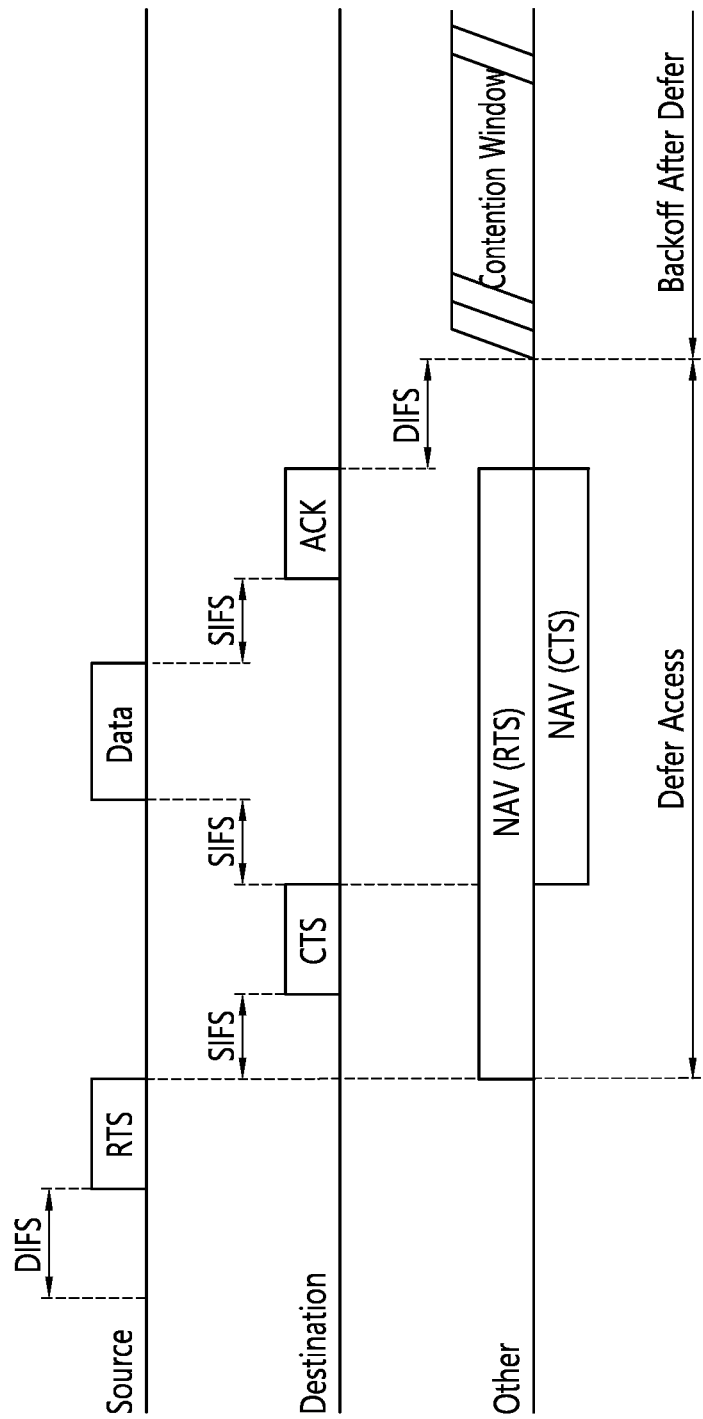
FIG. 13 illustrates an example of configuring a NAV when a RTS frame and a CTS frame are transmitted and/or received.

FIG. 13 illustrates an example of configuring a NAV when a RTS frame and a CTS frame are transmitted and/or received.

This embodiment describes a configuration and reconfiguration of NAV for a non-DMG STA and a DMG STA supporting a single NAV. A DMG STA supporting multiple NAVs shall update their NAVs according to multiple NAV update procedures. An HE STA having two NAV timers shall update the NAV timers according to two NAV update procedures.

A STA that has received at least one valid frame from a PSDU may update the NAV by using information on a valid Duration field of the PSDU. In case an RA of the received frame is the same as the MAC address of the STA itself, the STA shall not update the NAV. Additionally, in case the received frame is a DMG CTS frame, and in case a TA is the same as the MAC address of the STA itself, the STA shall not update the NAV. For all of the other received frames, the STA shall update the NAV in case the received Duration is greater than a current NAV value of the STA. If a PS-Poll frame is received, the STA shall appropriately update the NAV configuration in accordance with a data rate selection rule by using the same Duration value as a time (microseconds) needed for transmitting one Ack frame and one SIFS. However, this is only limited to a case where anew NAV value is greater than the current NAV value. If a fractional microsecond is included in the calculated Duration, the corresponding value is rounded to a next higher integer.

Various additional conditions may configure or reconfigure the NAV for the STA and not the HE STA. When the NAV is reconfigured, a PHY-CCARESET.request primitive shall be issued. This NAV updating operation is performed when a PHY-RXEND.indication primitive is received. However, except for a case where the PHY-RXEND.indication primitive is received before an end of a PPDU, the NAV update is performed at a predicted end of the PPDU.

Although FIG. 13 illustrates the NAV of an STA that can receive an RTS frame, since another STA may receive a CTS frame, a low NAV bar is formed (excluding an STA having an RTS frame addressed thereto), as shown in the drawing.

The STA, which uses information as the most recent basis for updating the NAV configured from an RTS frame or MU-RTS trigger frame, may reconfigure the NAV, if a PHY-RXSTART.indication primitive is not received from the PHY during a NAVTimeout duration. The MAC receives a PHY-RXEND.indication primitive corresponding to detection of an RTS frame or MU-RTS trigger frame.

In a non-DMG BSS, a NAVTimeout duration is the same as (2×aSIFSTime)+(CTS_Time)+aRxPHYStartDelay+(2× aSlotTime). If a non-S1G STA uses an RTS frame for a most recent NAV update, a "CTS_Time" shall be calculated by using a length of a CTS frame and a data rate that was used by the RTS frame for a most recent NAV update. If a MU-RTS trigger frame was used for the most recent NAV update, the "CTS_Time" frame shall be calculated by using the length of the CTS frame and a 6 Mb/s data rate. In an SIG STA, the "CTS_Time" shall be calculated by using a time that is needed for transmitting a NDP CTS frame, which is the same as an NDPTxTime.

4. Reason why NAV Status Report (NSR) is Needed

In a 6 GHz channel, a frame transmission from a UE performed by AP scheduling is likely to be expanded.

A legacy UE of 6 GHz is limitedly defined as an 11ax UE, and an 11ax UE mandatorily supports a Tigger-Based (TB) PPDU transmission performed by AP scheduling. A post 11ax (e.g., Extremely High Throughput (EHT)) UE is also expected to support TB PPDU transmission, which is performed by AP scheduling.

In 802.11ax, a carrier sensing rule for HE TB PPDU transmission used by a non-AP STA, which has received UL resource allocation through a trigger frame is defined as follows. A CS Required subfield of a trigger frame that will be described later on is shown in FIG. 10 (as a block corresponding to B17).

The CS Required subfield of a Common Info field shown in FIG. 10 is set to 1 in order to indicate that energy detection (ED) shall be used in order to consider a NAV when a STA, which is identified in a User Info field, detects a medium and determines a status of the medium and whether or not to send a response. The CS Required subfield is set to 0 in order to indicate that the STA, which is identified in the User Info field, does not need to determine whether or not to send a response while considering the medium status or NAV.

1) If a CS Required subfield configuration value of a trigger frame is equal to 1, after receiving the Trigger frame, the STA performs physical carrier sensing by using ED during a SIFS duration until a time point before transmitting a HE TB PPDU. As a result of the physical carrier sensing, in case a 20 MHz-unit BW channel including an allocated RU is determined as being IDLE, and, as a result of virtual carrier sensing, in case the channel is determined as being IDLE (i.e., in case a basic NAV value is equal to 0), the STA transmits the HE TB PPDU. As a result of physical carrier sensing or virtual carrier sensing, in case the channel is not IDLE (in case the channel is BUSY), the STA does not transmit the HE TB PPDU.

2) If a CS Required subfield configuration value of a trigger frame is equal to 0, regardless of the physical carrier sensing and virtual carrier sensing result(s) (i.e., regardless of whether the channel is busy/idle), the STA transmits the HE TB PPDU.

According to the above-described method, since an interference status from an OBSS and an idle/busy channel status between an AP and a non-AP STA may be different, when the AP allocates resource to the STA being in a channel busy state through the Trigger frame, resources may be wasted.

In 802.11ax, although a procedure for reporting a busy/idle state of each 20 MHz channel unit in a wide BW through a Bandwidth Query Report (BQR) procedure is defined, this is a procedure that merely report a physical carrier sensing result for allocating a RU that belongs to an idle channel to a UE and not a procedure for reporting a virtual carrier sensing result including NAV values. That is, there is no information on how long a Busy state of a specific channel will be maintained for the corresponding UE.

In a Post 11ax wireless LAN system, such as EHT, in order to allow the AP to carry out UL scheduling more efficiently, the AP needs to know the virtual carrier sensing result (NAV status) of the UE.

5. NSR Method

1) Option 1:

A NAV value report procedure is defined by modifying the existing BQRP Trigger frame and HE BQR Control field. The BQRP Trigger frame is a type of Trigger frame that is defined in Table 4, which is presented above. If a Control ID subfield, which is included in a Control subfield of an A-Control subfield, is equal to 5, a Control Information subfield of the Control subfield includes a Bandwidth Query Report (BQR) that is used in a bandwidth query reporting operation for supporting HE MU transmission.

In the BQRP Trigger frame, a non-AP STA, which has received the BQRP Trigger frame through a 1 bit indication, may instruct (or indicate) whether or not to include NAV status report information in a BQR Control field.

Additionally, a 1 bit new subfield is added to the BQR Control field, thereby allowing the non-AP STA to report a channel busy/idle state for the virtual carrier sensing result.

Additionally, a new subfield is added to the BQR Control field, thereby allowing the non-AP STA to report the NAV value.

2) Option 2:

A new Trigger frame (NSRP Trigger frame) for triggering NSR information may be defined and a new NSR feedback control frame may be defined (this may be defined in a Control field format or as a Control frame).

<Example Defining a NSRP Trigger Frame>

A NSRP Trigger frame may be defined as a format that is similar to a Buffer Status Report Poll (BSRP) Trigger frame. The BSRP Trigger frame is a type of Trigger frame that is defined in Table 4, which is presented above.

A CS Required subfield of the NSRP Trigger frame may be set to 0, thereby allowing a UE that is even in a channel busy state to report NAV status information.

In case a specific time duration value is optionally included in the NSRP Trigger frame, and in case a NAV value of the UE is greater than the specific time duration value, the NSRP Trigger frame may instruct (or indicate) the non-AP STA to be reported as being in the channel busy state. Alternatively, the NSRP Trigger frame may instruct the non-AP STA to report the busy/idle state of the channel after the specific time duration.

The non-AP STA that has received the NSRP Trigger frame transmits, to the AP, a frame including NSR information in a Trigger based PPDU format.

The NSRP Trigger frame may be defined by modifying a NDP Feedback Report Poll (NFRP) Trigger frame. In this case, the NDRP Trigger frame may be defined to transmit feedback through a NDP Feedback after differentiating the NAV value as 0 or a non-zero value. The NDRP Trigger frame is a type of Trigger frame that is defined in Table 4, which is presented above.

Additionally, the NSRP Trigger frame may be used by integrating the NSRP Trigger frame with a BSRP Trigger frame. The BSRP Trigger frame may include a 1 bit indicator. The 1 bit indicator may instruct (or indicate) a non-AP STA, which has received a NSRP/BSRP Trigger frame, whether or not to transmit a NSR Control frame while including a BSR frame. Additionally, a trigger frame indicating BSR+NSR may be defined by a specific Trigger Type value.

<Example Defining a NSR Control Frame>

A NSR Control frame includes NAV value information. The NAV value information includes a current NAV value. When managing two NAV timers of a basic NAV (Inter-BSS NAV) and an Intra-BSS NAV, a Basic NAV value may be included in the NAV value information. A NAV value that is updated through an Intra-BSS frame may not be included in the NAV value information, or may be reported as 0. In case the NAV value information is indicated as 1 bit, the NAV value may be indicated as 0 or a non-zero value.

A Basic NAV is a NAV that is configured through an Inter-BSS frame, and an Intra-BSS NAV is a NAV that is configured through an Intra-BSS frame (also referred to as an Overlapping-BSS frame). For example, the Inter-BSS frame may be a frame being received from My AP, and an Intra-BSS frame may be a frame being received from an AP, which exists within an OBSS.

When an 11ax STA receives a specific frame, the 11ax STA may determine whether the corresponding frame is an Inter-BSS frame or an Intra-BSS frame. A BSS color ID is included in an SIG-A of all 11ax frames. Herein, the BSS color ID may be considered as an identifier of a BSS or an ID of an AP. That is, an 11ax STA may differentiate an Inter-BSS frame and an Intra-BSS frame through the BSS color ID. Additionally, based on a Receiving Address (RA) field or other PHY preamble information within a MAC header of the corresponding frame, the STA may know whether or not it is the intended receiver (or recipient). Therefore, the Basic NAV or Inter-BSS NAV may be updated through the RA field or other PHY preamble information.

Additionally, the NSR Control frame may optionally include BSSID information. In case a non-zero NAV value is reported, a BSSID value of a reception frame (NSR Control frame), which has caused the corresponding NAV update, may be configured.

In case the reported NAV value is equal to 0, the NSR Control frame may omit the BSSID or may configure a specific value (e.g., associated BSSID value) as the BSSID value. The BSSID may be expressed as a compressed format, such as a truncated format or a hashed format.

Additionally, the NSR Control frame may optionally include Band, link information, and channel information. When Multi-band operation is supported, in case of managing multiple NAV timers according to each band (i.e., 2.4 GHz, 5 GHz, and 6 GHz channels), the NSR Control frame may indicate to which band (or channel) the NSR information belongs. When Multi-link operation is supported, in case of managing multiple NAV timers according to each link (i.e., link1, link2, . . . , link N), the NSR Control frame may indicate to which link (or channel) the NSR information belongs (e.g., BSSID/BSS Color corresponding to a link ID or link).

The BSSID may be included in a MAC header (or MPDU) within an address 3 field. The address 3 field may generally include a BSSID in a Destination Address (DA) (herein, a MAC address of the AP). As described above, as another ID for identifying the BSS, the BSS color ID may be included in SIG-A. Although the BSSID and the BSS color ID are information that are not related to one another, they are both used as identifiers for identifying the BSS. Not only the BSSID but also the BSS color ID may be included in the NSR Control frame.

6. Detailed Example of a NSR Procedure

1) Solicited Method

Figure 14:
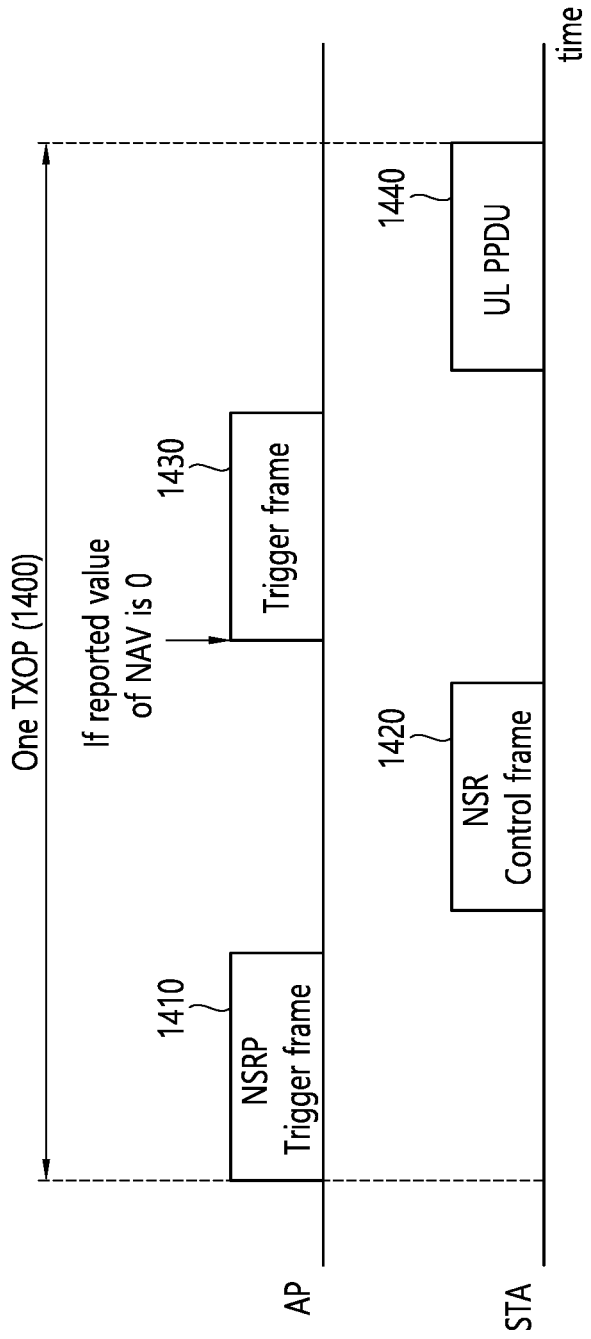
FIG. 14 illustrates an example for performing a NSR procedure by using a solicited method.

FIG. 14 illustrates an example for performing a NSR procedure by using a solicited method.

Referring to FIG. 14, an AP transmits a NSRP Trigger frame (1410), and an STA transmits a NSR Control frame (1420) as a response to the NSRP Trigger frame. The NSR Control frame may include a NAV value and a BSSID.

In case a reported NAV value is a non-zero value, the AP shall not transmit a trigger frame for the corresponding STA before a NAV timer of the STA is expired.

In case the reported NAV value is equal to 0, the AP may transmit a trigger frame (1430) within a same TXOP (1400) or within a predefined time duration, so as to perform scheduling for transmission of a UL PPDU (1440) of the STA.

2) Unsolicited Method

Figure 15:
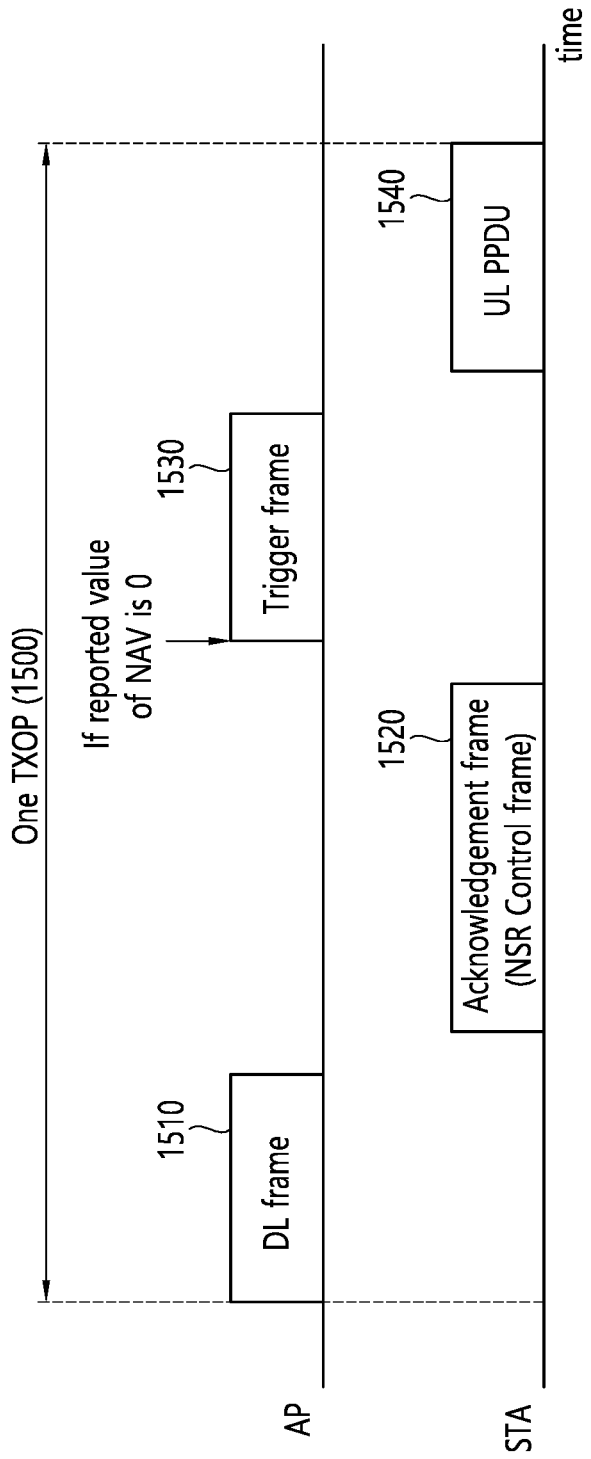
FIG. 15 illustrates an example for performing a NSR procedure by using an unsolicited method.

FIG. 15 illustrates an example for performing a NSR procedure by using an unsolicited method.

Referring to FIG. 15, an AP transmits a downlink (DL) frame to an STA. The DL frame includes a Quality of Service (QoS) data frame. After receiving the DL frame, the STA transmits an acknowledgement frame (e.g., Ack, Block-Ack (BA) or Multi-BlockAck (M-BA) frame (1520)). And, at this point, the STA may also transmit a NSR Control frame (1520) together by using an A-MPDU method.

In case a reported NAV value is a non-zero value, the AP shall not transmit a trigger frame for the corresponding STA before a NAV timer of the STA is expired.

In case the reported NAV value is equal to 0, the AP may transmit a trigger frame (1530) within a same TXOP (1500) or within a predefined time duration, so as to perform scheduling for transmission of a UL PPDU (1540) of the STA.

3) Multi-Band Operation Using NSR

An STA supporting Multi-Band Aggregation/Operation reports a NAV value of another band (e.g., 6 GHz channel) through a channel of a 2.4 GHz or 5 GHz band. And, by doing so, the STA may efficiently perform UL scheduling of the corresponding band channel (i.e., 6 GHz) of an AP for the corresponding STA.

As described above, an STA supporting Multi-Band Aggregation/Operation and an AP may separately (or individually) manage/support a NAV timer per band. For example, the corresponding STA and AP may separately manage one NAV timer for 2.4 GHz/5 GHz and one NAV timer for 6 GHz, or may separately manage three NAV timers for each of 2.4 GHz, 5 GHz, and 6 GHz.

4) Multi-Link Operation Using NSR

An STA supporting Multi-link Aggregation/Operation may transmit NAV information of a link of one side (e.g., Link 1) through a link of another side (e.g., link 2). For example, when NAV information cannot be transmitted because the NAV value of link 1 is a non-zero value, the NAV of link 1 may be transmitted through link 2. For this, the STA supporting Multi-link Aggregation/Operation and the AP may separately manage/support a NAV timer per link. For example, one NAV Timer for Link1 and one NAV Timer for Link2 may be separately managed.

Hereinafter, a detailed embodiment will be described with reference to FIG. 13 to FIG. 15.

Figure 16:
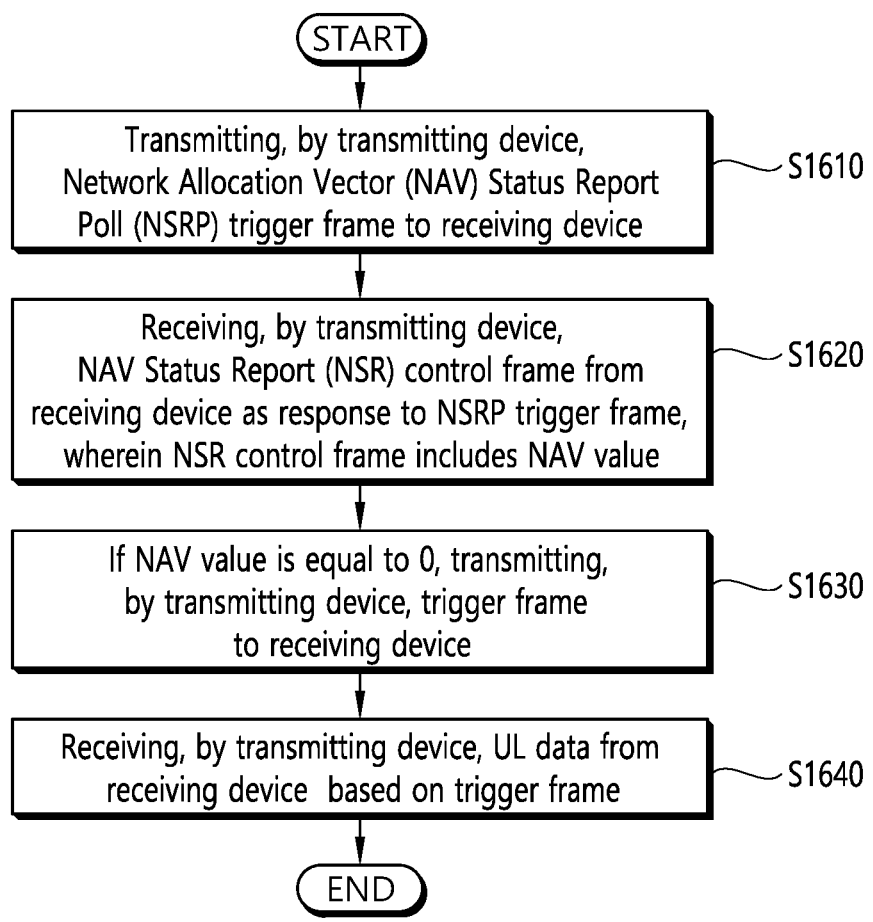
FIG. 16 is a flowchart illustrating a procedure for receiving uplink (UL) data according to an embodiment of the present disclosure.

FIG. 16 is a flowchart illustrating a procedure for receiving uplink (UL) data according to an embodiment of the present disclosure.

An example of FIG. 16 may be performed in a network environment in which a next generation wireless LAN system is being supported. The next generation wireless LAN system is a wireless LAN system that is enhanced from an 802.11ax system and may, therefore, satisfy backward compatibility with the 802.11ax system. The next generation wireless LAN system may correspond to an Extreme High Throughput (EHT) wireless LAN system or an 802.11be wireless LAN system.

In order to allow an AP to perform UL scheduling more efficiently in a next generation wireless LAN system, such as EHT, this embodiment proposes a method for reporting a NAV status, which is a result of virtual carrier sensing of an STA. By receiving the NAV status report from the STA, the AP may verify until when a BUSY state of a specific channel will be maintained for the corresponding STA. Thus, since the AP does not transmit a trigger frame that allocates resource to an STA being in a BUSY state for the specific channel, unnecessary waste of resources may be prevented.

The example of FIG. 16 may be performed by a transmitting device, and the transmitting device may correspond to an AP. A receiving device of FIG. 16 may correspond to an STA supporting an Extreme High Throughput (EHT) wireless LAN system.

In step S1610, the transmitting device transmits a Network Allocation Vector (NAV) Status Report Poll (NSRP) trigger frame to the receiving device.

In step S1620, the transmitting device receives a NAV Status Report (NSR) control frame from the receiving device as a response to the NSRP trigger frame. The NSR control frame includes a NAV value. The NSR control frame represents a frame including NAV information and is not limited to a control frame. Herein, it will be apparent that the NAV information may be transmitted in another format (e.g., management frame, action frame, piggybacked frame, and so on). And, for simplicity in the description, in the present disclosure, this frame will be referred to as a NSR control frame.

In step S1630, if the NAV value is equal to 0, the transmitting device transmits a trigger frame to the receiving device.

In step S1640, the transmitting device receives the UL data from the receiving device based on the trigger frame.

The NSRP trigger frame may include a Channel Sensing (CS) Required subfield. The CS Required subfield may perform a same role (or function) as a CS Required subfield of a trigger frame, which is defined in 802.11ax.

The CS Required subfield may be set to 0. Accordingly, even if the channel through which the NSR control frame is being transmitted is BUSY, the NAV value may be reported to the transmitting device. That is, by setting the CS Required subfield to 0, even an STA that is in a BUSY state for the corresponding channel may be capable of reporting the NAV value.

The NSRP trigger frame may further include a time duration value. For example, in case the NAV value is greater than or equal to the time duration value, the channel may be reported as being BUSY. Additionally, in case the NAV value is smaller than the time duration value, the channel may be reported as being IDLE. As another example, the NSRP trigger frame may instruct the channel status after the time duration value to be reported.

The NSRP trigger frame may be generated based on a Buffer Status Report Poll (BSRP) trigger frame, which is defined in the 802.11ax wireless LAN system.

The BSRP trigger frame may include indicator information. The indicator information may include information on whether or not buffer status information and the NAV value are included in the NSR control frame. That is, by defining a specific trigger frame type, a trigger frame may be configured so as to report both the buffer status information and the NAV status information through the NSR control frame.

The NAV value may be a basic NAV value that is configured based on an Inter-Basic Service Set (BSS) frame. The NAV value may not include a NAV value that is configured based on an Intra-BSS frame.

The NSR control frame may further include a BSSID or BSS Color as an identifier for identifying a BSS. In the present disclosure, for simplicity in the description, only the BSSID will be mentioned as the identifier for identifying a BSS. In case the NAV value is not equal to 0, the BSSID may be configured as an identifier of a BSS in which the Inter-BSS frame is received (or a BSS identifier that is used for configuring the NAV). In case the NAV value is equal to 0, the BSSID may not be reported or may be set to a preconfigured value. That is, the BSSID may be omitted, and the preconfigured value may be set as an associated BSSID value.

The NSR control frame may further include a BSS color ID as an identifier for identifying a BSS.

The BSSID may be included in an address field within a MAC header, and the BSS color ID may be included in a High Efficiency (HE)-signal (SIG)-A, which is defined in the 802.11ax wireless LAN system.

The receiving device may include the NAV value, the BSSID, or the BSS color ID as information on the NAV status, and may report the information on the NAV status to the transmitting device.

The NSR control frame may further include band information for multi-band operation or multi-link operation, identification information for identifying a BSS, and channel information.

The band information may include information on a NAV value, which is defined per band performing the multi-band operation (or per link performing the multi-link operation). The channel information may include information on a NAV value, which is defined per channel performing the multi-band operation. That is, an AP and an STA may separately manage or support a NAV timer per band (or per channel or per link).

A band performing the multi-band operation may be a 2.4 GHz band, a 5 GHz band, or a 6 GHz band. For example, an AP and an STA may separately manage one NAV timer for a 2.4 GHz/5 GHz band and one NAV timer for a 6 GHz band. As another example, an AP and an STA may separately manage a NAV timer for each of the 2.4 GHz, 5 GHz, and 6 GHz bands (a total of three NAV timers).

If the NAV value is not equal to 0, the trigger frame is not transmitted until a NAV timer of the receiving device is expired. Since a specific channel status for the receiving device is BUSY, this is to prevent unnecessary resource from being wasted by transmitting the trigger frame. After waiting until the NAV timer of the receiving device is expired and the channel status becomes IDLE, the transmitting device allocates resource by transmitting the trigger frame. Thus, efficient UL scheduling may be performed.

The trigger frame may be transmitted during one Transmission Opportunity (TXOP) or predetermined time duration.

During the one TXOP, the NSRP trigger frame, the NSR control frame, and the UL data may be transmitted/received.

Figure 17:
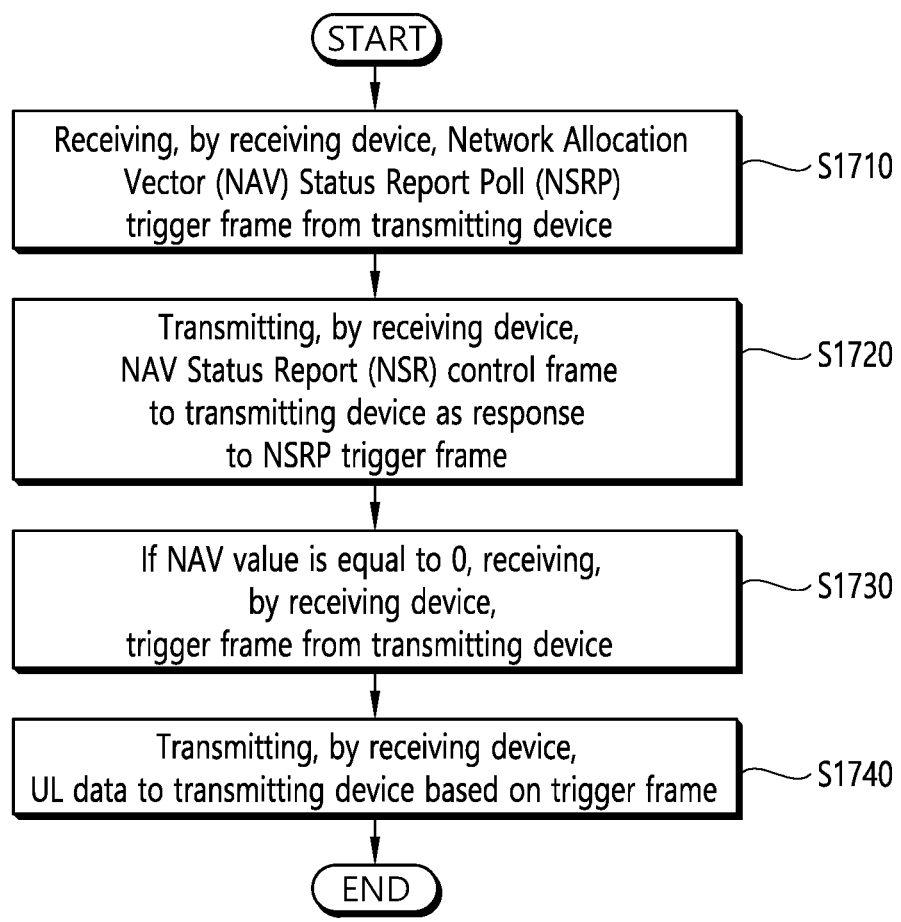
FIG. 17 is a flowchart illustrating a procedure for transmitting UL data according to an embodiment of the present disclosure.

FIG. 17 is a flowchart illustrating a procedure for transmitting UL data according to an embodiment of the present disclosure.

An example of FIG. 17 may be performed in a network environment in which a next generation wireless LAN system is being supported. The next generation wireless LAN system is a wireless LAN system that is enhanced from an 802.11ax system and may, therefore, satisfy backward compatibility with the 802.11ax system. The next generation wireless LAN system may correspond to an Extreme High Throughput (EHT) wireless LAN system or an 802.11be wireless LAN system.

In order to allow an AP to perform UL scheduling more efficiently in a next generation wireless LAN system, such as EHT, this embodiment proposes a method for reporting a NAV status, which is a result of virtual carrier sensing of an STA. By receiving the NAV status report from the STA, the AP may verify until when a BUSY state of a specific channel will be maintained for the corresponding STA. Thus, since the AP does not transmit a trigger frame that allocates resource to an STA being in a BUSY state for the specific channel, unnecessary waste of resources may be prevented.

The example of FIG. 17 is performed by an STA supporting an Extreme High Throughput (EHT) wireless LAN system. A transmitting device of FIG. 17 may correspond to an AP.

In step S1710, a receiving device receives a Network Allocation Vector (NAV) Status Report Poll (NSRP) trigger frame from the transmitting device.

In step S1720, the receiving device transmits a NAV Status Report (NSR) control frame to the transmitting device as a response to the NSRP trigger frame. The NSR control frame includes a NAV value. The NSR control frame represents a frame including NAV information and is not limited to a control frame. Herein, it will be apparent that the NAV information may be transmitted in another format (e.g., management frame, action frame, piggybacked frame, and so on). And, for simplicity in the description, in the present disclosure, this frame will be referred to as a NSR control frame.

In step S1730, if the NAV value is equal to 0, the receiving device receives a trigger frame from the transmitting device.

In step S1740, the receiving device transmits the UL data to the transmitting device based on the trigger frame.

The NSRP trigger frame may include a Channel Sensing (CS) Required subfield. The CS Required subfield may perform a same role (or function) as a CS Required subfield of a trigger frame, which is defined in 802.11ax.

The CS Required subfield may be set to 0. Accordingly, even if the channel through which the NSR control frame is being transmitted is BUSY, the NAV value may be reported to the transmitting device. That is, by setting the CS Required subfield to 0, even an STA that is in a BUSY state for the corresponding channel may be capable of reporting the NAV value.

The NSRP trigger frame may further include a time duration value. For example, in case the NAV value is greater than or equal to the time duration value, the channel may be reported as being BUSY. Additionally, in case the NAV value is smaller than the time duration value, the channel may be reported as being IDLE. As another example, the NSRP trigger frame may instruct the channel status after the time duration value to be reported.

The NSRP trigger frame may be generated based on a Buffer Status Report Poll (BSRP) trigger frame, which is defined in the 802.11ax wireless LAN system.

The BSRP trigger frame may include indicator information. The indicator information may include information on whether or not buffer status information and the NAV value are included in the NSR control frame. That is, by defining a specific trigger frame type, a trigger frame may be configured so as to report both the buffer status information and the NAV status information through the NSR control frame.

The NAV value may be a basic NAV value that is configured based on an Inter-Basic Service Set (BSS) frame. The NAV value may not include a NAV value that is configured based on an Intra-BSS frame.

The NSR control frame may further include a BSSID or BSS Color as an identifier for identifying a BSS. In the present disclosure, for simplicity in the description, only the BSSID will be mentioned as the identifier for identifying a BSS. In case the NAV value is not equal to 0, the BSSID may be configured as an identifier of a BSS in which the Inter-BSS frame is received (or a BSS identifier that is used for configuring the NAV). In case the NAV value is equal to 0, the BSSID may not be reported or may be set to a preconfigured value. That is, the BSSID may be omitted, and the preconfigured value may be set as an associated BSSID value.

The NSR control frame may further include a BSS color ID as an identifier for identifying a BSS.

The BSSID may be included in an address field within a MAC header, and the BSS color ID may be included in a High Efficiency (HE)-signal (SIG)-A, which is defined in the 802.11ax wireless LAN system.

The receiving device may include the NAV value, the BSSID, or the BSS color ID as information on the NAV status, and may report the information on the NAV status to the transmitting device.

The NSR control frame may further include band information for multi-band operation or multi-link operation, identification information for identifying a BSS, and channel information.

The band information may include information on a NAV value, which is defined per band performing the multi-band operation (or per link performing the multi-link operation). The channel information may include information on a NAV value, which is defined per channel performing the multi-band operation. That is, an AP and an STA may separately manage or support a NAV timer per band (or per channel or per link).

A band performing the multi-band operation may be a 2.4 GHz band, a 5 GHz band, or a 6 GHz band. For example, an AP and an STA may separately manage one NAV timer for a 2.4 GHz/5 GHz band and one NAV timer for a 6 GHz band. As another example, an AP and an STA may separately manage a NAV timer for each of the 2.4 GHz, 5 GHz, and 6 GHz bands (a total of three NAV timers).

If the NAV value is not equal to 0, the trigger frame is not transmitted until a NAV timer of the receiving device is expired. Since a specific channel status for the receiving device is BUSY, this is to prevent unnecessary resource from being wasted by transmitting the trigger frame. After waiting until the NAV timer of the receiving device is expired and the channel status becomes IDLE, the transmitting device allocates resource by transmitting the trigger frame. Thus, efficient UL scheduling may be performed.

The trigger frame may be transmitted during one Transmission Opportunity (TXOP) or predetermined time duration.

During the one TXOP, the NSRP trigger frame, the NSR control frame, and the UL data may be transmitted/received.

7. Device Configuration

Figure 18:
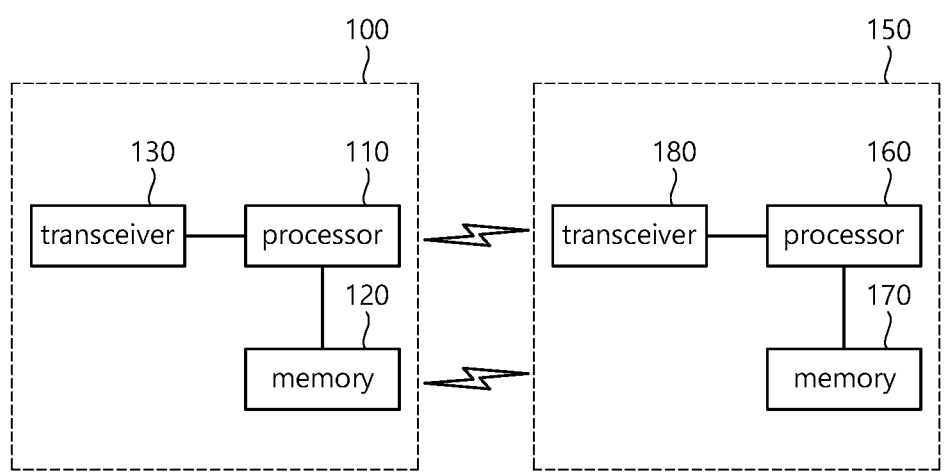
FIG. 18 is a diagram for describing a device for implementing the above-described method.

FIG. 18 is a diagram for describing a device for implementing the above-described method.

A wireless device (100) of FIG. 18 is a transmitting device that can implement the above-described embodiment and may be operated as an AP STA. A wireless device (150) of FIG. 18 is a receiving device that can implement the above-described embodiment and may be operated as a non-AP STA.

The transmitting device (100) may include a processor (110), a memory (120), and a transmitting/receiving unit (130), and the receiving device (150) may include a processor (160), a memory (170), and a transmitting/receiving unit (180). The transmitting/receiving unit (130, 180) transmits/receives a radio signal and may be operated in a physical layer of IEEE 802.11/3GPP, and so on. The processor (110, 160) may be operated in the physical layer and/or MAC layer and may be operatively connected to the transmitting/receiving unit (130, 180).

The processor (110, 160) and/or the transmitting/receiving unit (130, 180) may include application-specific integrated circuit (ASIC), other chipset, logic circuit and/or data processor. The memory (120, 170) may include read-only memory (ROM), random access memory (RAM), flash memory, memory card, storage medium and/or other storage unit. When the embodiments are executed by software, the techniques (or methods) described herein can be executed with modules (e.g., processes, functions, and so on) that perform the functions described herein. The modules can be stored in the memory (120, 170) and executed by the processor (110, 160). The memory (120, 170) can be implemented (or positioned) within the processor (110, 160) or external to the processor (110, 160). Also, the memory (120, 170) may be operatively connected to the processor (110, 160) via various means known in the art.

The processor (110, 160) may implement the functions, processes and/or methods proposed in the present disclosure. For example, the processor (110, 160) may perform the operation according to the present embodiment.

Operations of a processor (110) of the transmitting device will be described in detail as follows. The processor (110) of the transmitting device transmits a NSRP trigger frame and receives a NSR control frame including a NAV value, as a response to the NSRP trigger frame. If the NAV value is equal to 0, the processor (110) of the transmitting device transmits a trigger frame and receives UL data based on the trigger frame.

Operations of a processor (160) of the receiving device will be described in detail as follows. The processor (160) of the receiving device receives a NSRP trigger frame and transmits a NSR control frame including a NAV value, as a response to the NSRP trigger frame. If the NAV value is equal to 0, the processor (160) of the receiving device receives a trigger frame and transmits UL data based on the trigger frame.

Figure 19:
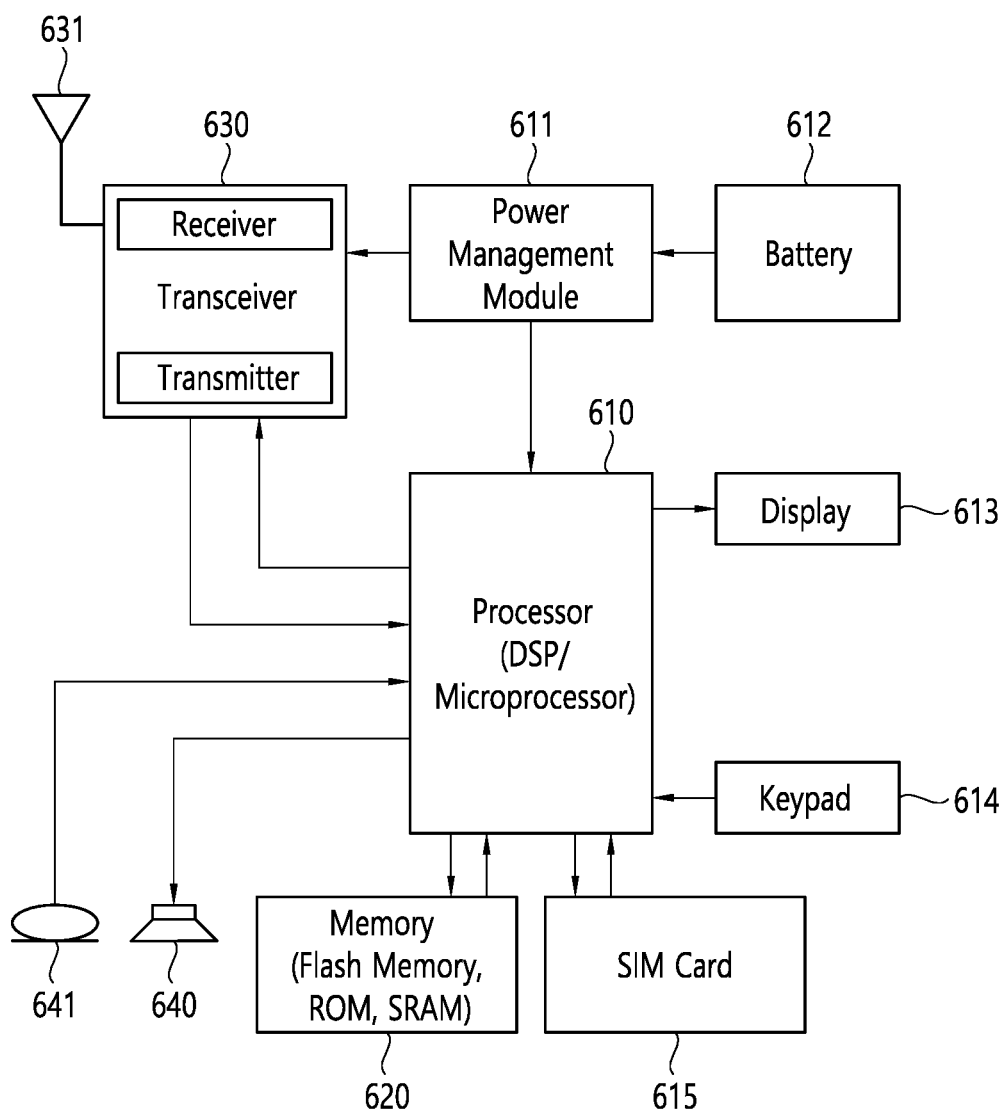
FIG. 19 illustrates a more detailed wireless device for implementing the embodiment of the present disclosure.

FIG. 19 shows a UE to which the technical features of the present disclosure can be applied.

A UE includes a processor (610), a power management module (611), a battery (612), a display (613), a keypad (614), a subscriber identification module (SIM) card (615), a memory (620), a transceiver (630), one or more antennas (631), a speaker (640), and a microphone (641).

The processor (610) may be configured to implement proposed functions, procedures and/or methods of the present disclosure described below. The processor (610) may include application-specific integrated circuit (ASIC), other chipset, logic circuit and/or data processing device. The processor (610) may be an application processor (AP). The processor (610) may include at least one of a digital signal processor (DSP), a central processing unit (CPU), a graphics processing unit (GPU), a modem (modulator and demodulator). An example of the processor (610) may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module (611) manages power for the processor (610) and/or the transceiver (630). The battery (612) supplies power to the power management module (611). The display (613) outputs results processed by the processor (610). The keypad (614) receives inputs to be used by the processor (610). The keypad (614) may be shown on the display (613). The SIM card (615) is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory (620) is operatively coupled with the processor (610) and stores a variety of information to operate the processor (610). The memory (620) may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory (620) and executed by the processor (610). The memory (620) can be implemented within the processor (610) or external to the processor (610) in which case those can be communicatively coupled to the processor (610) via various means as is known in the art.

The transceiver (630) is operatively coupled with the processor (610), and transmits and/or receives a radio signal. The transceiver (630) includes a transmitter and a receiver. The transceiver (630) may include baseband circuitry to process radio frequency signals. The transceiver (630) controls the one or more antennas (631) to transmit and/or receive a radio signal.

The speaker (640) outputs sound-related results processed by the processor (610). The microphone (641) receives sound-related inputs to be used by the processor (610).

In case of a transmitting device, the processor (610) transmits a NSRP trigger frame and receives a NSR control frame including a NAV value, as a response to the NSRP trigger frame. If the NAV value is equal to 0, the processor (610) transmits a trigger frame and receives UL data based on the trigger frame.

In case of a receiving device, the processor (610) receives a NSRP trigger frame and transmits a NSR control frame including a NAV value, as a response to the NSRP trigger frame. If the NAV value is equal to 0, the processor (610) receives a trigger frame and transmits UL data based on the trigger frame.

The NSRP trigger frame may include a Channel Sensing (CS) Required subfield. The CS Required subfield may perform a same role (or function) as a CS Required subfield of a trigger frame, which is defined in 802.11ax.

The CS Required subfield may be set to 0. Accordingly, even if the channel through which the NSR control frame is being transmitted is BUSY, the NAV value may be reported to the transmitting device. That is, by setting the CS Required subfield to 0, even an STA that is in a BUSY state for the corresponding channel may be capable of reporting the NAV value.

The NSRP trigger frame may further include a time duration value. For example, in case the NAV value is greater than or equal to the time duration value, the channel may be reported as being BUSY. Additionally, in case the NAV value is smaller than the time duration value, the channel may be reported as being IDLE. As another example, the NSRP trigger frame may instruct the channel status after the time duration value to be reported.

The NSRP trigger frame may be generated based on a Buffer Status Report Poll (BSRP) trigger frame, which is defined in the 802.11ax wireless LAN system.

The BSRP trigger frame may include indicator information. The indicator information may include information on whether or not buffer status information and the NAV value are included in the NSR control frame. That is, by defining a specific trigger frame type, a trigger frame may be configured so as to report both the buffer status information and the NAV status information through the NSR control frame.

The NAV value may be a basic NAV value that is configured based on an Inter-Basic Service Set (BSS) frame. The NAV value may not include a NAV value that is configured based on an Intra-BSS frame.

The NSR control frame may further include a BSSID or BSS Color as an identifier for identifying a BSS. In the present disclosure, for simplicity in the description, only the BSSID will be mentioned as the identifier for identifying a BSS. In case the NAV value is not equal to 0, the BSSID may be configured as an identifier of a BSS in which the Inter-BSS frame is received (or a BSS identifier that is used for configuring the NAV). In case the NAV value is equal to 0, the BSSID may not be reported or may be set to a preconfigured value. That is, the BSSID may be omitted, and the preconfigured value may be set as an associated BSSID value.

The NSR control frame may further include a BSS color ID as an identifier for identifying a BSS.

The BSSID may be included in an address field within a MAC header, and the BSS color ID may be included in a High Efficiency (HE)-signal (SIG)-A, which is defined in the 802.11ax wireless LAN system.

The receiving device may include the NAV value, the BSSID, or the BSS color ID as information on the NAV status, and may report the information on the NAV status to the transmitting device.

The NSR control frame may further include band information for multi-band operation or multi-link operation, identification information for identifying a BSS, and channel information.

The band information may include information on a NAV value, which is defined per band performing the multi-band operation (or per link performing the multi-link operation). The channel information may include information on a NAV value, which is defined per channel performing the multi-band operation. That is, an AP and an STA may separately manage or support a NAV timer per band (or per channel or per link).

A band performing the multi-band operation may be a 2.4 GHz band, a 5 GHz band, or a 6 GHz band. For example, an AP and an STA may separately manage one NAV timer for a 2.4 GHz/5 GHz band and one NAV timer for a 6 GHz band. As another example, an AP and an STA may separately manage a NAV timer for each of the 2.4 GHz, 5 GHz, and 6 GHz bands (a total of three NAV timers).

If the NAV value is not equal to 0, the trigger frame is not transmitted until a NAV timer of the receiving device is expired. Since a specific channel status for the receiving device is BUSY, this is to prevent unnecessary resource from being wasted by transmitting the trigger frame. After waiting until the NAV timer of the receiving device is expired and the channel status becomes IDLE, the transmitting device allocates resource by transmitting the trigger frame. Thus, efficient UL scheduling may be performed.

The trigger frame may be transmitted during one Transmission Opportunity (TXOP) or predetermined time duration.

During the one TXOP, the NSRP trigger frame, the NSR control frame, and the UL data may be transmitted/received.

What is claimed is:

1. A method for receiving uplink (UL) data in a wireless LAN system, the method comprising:
   transmitting, by a transmitting device, a Network Allocation Vector (NAV) Status Report Poll (NSRP) trigger frame to a receiving device;
   receiving, by the transmitting device, a NAV Status Report (NSR) control frame from the receiving device as a response to the NSRP trigger frame, wherein the NSR control frame includes a NAV value;
   if the NAV value is equal to 0, transmitting, by the transmitting device, a trigger frame to the receiving device; and
   receiving, by the transmitting device, the UL data from the receiving device based on the trigger frame,
   wherein the NAV value is a basic NAV value being configured based on an Inter-Basic Service Set (BSS) frame, and
   wherein the NAV value does not include a NAV value being configured based on an Intra-BSS frame,
   wherein the NSR control frame further includes a BSSID as an identifier for identifying a BSS,
   wherein, in case the NAV value is not equal to 0, the BSSID is configured as an identifier of a BSS in which the Inter-BSS frame is received,
   wherein, in case the NAV value is equal to 0, the BSSID is not reported or is set to a preconfigured value,
   wherein the NSR control frame further includes a BSS color ID as an identifier for identifying a BSS,
   wherein the BSSID is included in an address field within a MAC header, and
   wherein the BSS color ID is included in a High Efficiency (HE)-signal (SIG)-A being defined in an 802.11ax wireless LAN system.

2. The method of claim 1, wherein the NSRP trigger frame includes a Channel Sensing (CS) Required subfield,
   wherein the CS Required subfield is set to 0, and
   wherein, even if the channel through which the NSR control frame is being transmitted is BUSY, the NAV value is reported to the transmitting device.

3. The method of claim 2, wherein the NSRP trigger frame further includes a time duration value,
   wherein, in case the NAV value is greater than or equal to the time duration value, the channel is reported as being BUSY, and
   wherein, in case the NAV value is smaller than the time duration value, the channel is reported as being IDLE.

4. The method of claim 1, wherein the NSRP trigger frame is generated based on a Buffer Status Report Poll (BSRP) trigger frame defined in an 802.11ax wireless LAN system,
   wherein the BSRP trigger frame includes indicator information, and
   wherein the indicator information includes information on whether or not buffer status information and the NAV value are included in the NSR control frame.

5. The method of claim 1, wherein the NSR control frame further includes band information for multi-band operation and channel information,
   wherein the band information includes information on a NAV value being defined per band performing the multi-band operation,
   wherein the channel information includes information on a NAV value being defined per channel performing the multi-band operation, and
   wherein a band performing the multi-band operation is a 2.4 GHz band, a 5 GHz band, or a 6 GHz band.

6. The method of claim 1, wherein, if the NAV value is not equal to 0, the trigger frame is not transmitted until a NAV timer of the receiving device is expired.

7. The method of claim 1, wherein the trigger frame is transmitted during one Transmission Opportunity (TXOP) or predetermined time duration, and
   wherein, during the one TXOP, the NSRP trigger frame, the NSR control frame, and the UL data are transmitted/received.

8. A transmitting device receiving uplink (UL) data in a wireless LAN system, the transmitting device comprising:
   a memory;
   a transceiver; and
   a processor being operatively coupled to the memory and the transceiver, wherein the processor is configured to:
transmit a Network Allocation Vector (NAV) Status Report Poll (NSRP) trigger frame to a receiving device,
receive a NAV Status Report (NSR) control frame from the receiving device as a response to the NSRP trigger frame, wherein the NSR control frame includes a NAV value,
transmit a trigger frame to the receiving device, if the NAV value is equal to 0, and
receive the UL data from the receiving device based on the trigger frame,
wherein the NAV value is a basic NAV value being configured based on an Inter-Basic Service Set (BSS) frame, and
wherein the NAV value does not include a NAV value being configured based on an Intra-BSS frame,
wherein the NSR control frame further includes a BSSID as an identifier for identifying a BSS,
wherein, in case the NAV value is not equal to 0, the BSSID is configured as an identifier of a BSS in which the Inter-BSS frame is received,
wherein, in case the NAV value is equal to 0, the BSSID is not reported or is set to a preconfigured value,
wherein the NSR control frame further includes a BSS color ID as an identifier for identifying a BSS,
wherein the BSSID is included in an address field within a MAC header, and
wherein the BSS color ID is included in a High Efficiency (HE)-signal (SIG)-A being defined in an 802.11ax wireless LAN system.

9. The transmitting device of claim 8, wherein the NSRP trigger frame includes a Channel Sensing (CS) Required subfield,
wherein the CS Required subfield is set to 0, and
wherein, even if the channel through which the NSR control frame is being transmitted is BUSY, the NAV value is reported to the transmitting device.

10. The transmitting device of claim 9, wherein the NSRP trigger frame further includes a time duration value,
wherein, in case the NAV value is greater than or equal to the time duration value, the channel is reported as being BUSY, and
wherein, in case the NAV value is smaller than the time duration value, the channel is reported as being IDLE.

11. The transmitting device of claim 8, wherein the NSRP trigger frame is generated based on a Buffer Status Report Poll (BSRP) trigger frame defined in an 802.11ax wireless LAN system,
wherein the BSRP trigger frame includes indicator information, and
wherein the indicator information includes information on whether or not buffer status information and the NAV value are included in the NSR control frame.

12. The transmitting device of claim 8, wherein the NSR control frame further includes band information for multi-band operation and channel information,
wherein the band information includes information on a NAV value being defined per band performing the multi-band operation,
wherein the channel information includes information on a NAV value being defined per channel performing the multi-band operation, and
wherein a band performing the multi-band operation is a 2.4 GHz band, a 5 GHz band, or a 6 GHz band.

13. The transmitting device of claim 8, wherein, if the NAV value is not equal to 0, the trigger frame is not transmitted until a NAV timer of the receiving device is expired.

14. A method for transmitting uplink (UL) data in a wireless LAN system, the method comprising:
receiving, by a receiving device, a Network Allocation Vector (NAV) Status Report Poll (NSRP) trigger frame from a transmitting device;
transmitting, by the receiving device, a NAV Status Report (NSR) control frame to the transmitting device as a response to the NSRP trigger frame, wherein the NSR control frame includes a NAV value;
if the NAV value is equal to 0, receiving, by the receiving device, a trigger frame from the transmitting device; and
transmitting, by the receiving device, the UL data to the transmitting device based on the trigger frame,
wherein the NAV value is a basic NAV value being configured based on an Inter-Basic Service Set (BSS) frame, and
wherein the NAV value does not include a NAV value being configured based on an Intra-BSS frame,
wherein the NSR control frame further includes a BSSID as an identifier for identifying a BSS,
wherein, in case the NAV value is not equal to 0, the BSSID is configured as an identifier of a BSS in which the Inter-BSS frame is received,
wherein, in case the NAV value is equal to 0, the BSSID is not reported or is set to a preconfigured value,
wherein the NSR control frame further includes a BSS color ID as an identifier for identifying a BSS,
wherein the BSSID is included in an address field within a MAC header, and
wherein the BSS color ID is included in a High Efficiency (HE)-signal (SIG)-A being defined in an 802.11ax wireless LAN system.

* * * * *